United States Patent
He et al.

(10) Patent No.: US 8,934,267 B2
(45) Date of Patent: Jan. 13, 2015

(54) LOOSELY REGULATED FEEDBACK CONTROL FOR HIGH EFFICIENCY ISOLATED DC-DC CONVERTERS

(75) Inventors: Jin He, Plano, TX (US); Jeffrey Boylan, Richardson, TX (US); Carl Wildrick, Parker, TX (US)

(73) Assignee: TDK-Lambda Corporation, Tokyo (JP)

( * ) Notice: Subject to any disclaimer, the term of this patent is extended or adjusted under 35 U.S.C. 154(b) by 224 days.

(21) Appl. No.: 13/070,959

(22) Filed: Mar. 24, 2011

(65) Prior Publication Data
US 2012/0112723 A1    May 10, 2012

Related U.S. Application Data

(60) Provisional application No. 61/411,672, filed on Nov. 9, 2010.

(51) Int. Cl.
H02M 3/335    (2006.01)
H02M 3/337    (2006.01)
H02M 1/00     (2006.01)

(52) U.S. Cl.
CPC ........ H02M 3/3378 (2013.01); *H02M 3/33592* (2013.01); *H02M 2001/0022* (2013.01); *Y02B 70/1475* (2013.01)
USPC ........................................ 363/21.15; 363/17

(58) Field of Classification Search
USPC ............. 323/293, 267; 363/84, 21.01, 21, 16, 363/21.07, 21.12, 21.15, 21.03, 21.04, 363/21.06, 21.08, 21.1
See application file for complete search history.

(56) References Cited

U.S. PATENT DOCUMENTS

| 4,254,301 | A | 3/1981 | Serino |
| 4,362,904 | A | 12/1982 | Schneider et al. |
| 5,138,249 | A | 8/1992 | Capel |
| 5,150,282 | A | 9/1992 | Tomura et al. |
| D340,907 | S | 11/1993 | Smith et al. |
| 5,303,123 | A | 4/1994 | Chandler et al. |
| 5,303,138 | A | 4/1994 | Rozman |
| D356,291 | S | 3/1995 | Kawamura |
| D363,056 | S | 10/1995 | Vinciarelli et al. |
| 5,481,436 | A | 1/1996 | Werther |

(Continued)

OTHER PUBLICATIONS

"Maxeta iFA Series DC-DC Power Modules 48V Input, 12V Output, 600W Full Brick"; TDK Innoveta, Inc.; Richardson, Texas, USA; Nov. 13, 2006; 18 pp.

(Continued)

*Primary Examiner* — Gary L Laxton
*Assistant Examiner* — Trinh Dang
(74) *Attorney, Agent, or Firm* — David W. Carstens; Sudhakar V. Allada; Carstens & Cahoon, LLP

(57) ABSTRACT

The improved DC-DC converter apparatus includes a primary side circuit and a secondary side circuit that is galvanically isolated from the primary. The primary side induces a voltage in the secondary side that provides an output voltage for driving POLs. A controller in the primary senses a reflected output voltage signal that is coupled from the secondary and is proportional to the secondary output voltage with respect to a voltage regulation point determined by either a voltage divider circuit or the zener voltage in the secondary. The voltage regulation point is established by wide-tolerance electrical components, such as a zener diode, a resistor, or a combination, connected in the coupling device circuit.

36 Claims, 13 Drawing Sheets

(56) References Cited

U.S. PATENT DOCUMENTS

| | | | |
|---|---|---|---|
| 5,590,032 A | 12/1996 | Bowman et al. | |
| 5,625,541 A | 4/1997 | Rozman | |
| 5,636,116 A | 6/1997 | Milavec et al. | |
| 5,659,461 A * | 8/1997 | Inou et al. | 363/21.16 |
| 5,870,290 A | 2/1999 | Chun et al. | |
| 5,880,930 A | 3/1999 | Wheaton | |
| 5,907,481 A | 5/1999 | Svardsjo | |
| 5,910,885 A | 6/1999 | Gulachenski et al. | |
| 5,920,475 A | 7/1999 | Boylan et al. | |
| D412,887 S | 8/1999 | Johnston | |
| 5,933,343 A | 8/1999 | Lu et al. | |
| 5,940,287 A | 8/1999 | Brkovic | |
| 5,999,417 A | 12/1999 | Schlecht | |
| 6,038,154 A | 3/2000 | Boylan et al. | |
| 6,088,243 A * | 7/2000 | Shin | 363/21.05 |
| 6,101,104 A | 8/2000 | Eng | |
| 6,169,675 B1 | 1/2001 | Shimamori et al. | |
| 6,189,203 B1 | 2/2001 | Heinrich et al. | |
| 6,191,954 B1 | 2/2001 | Keidl et al. | |
| 6,191,964 B1 | 2/2001 | Boylan et al. | |
| 6,201,304 B1 | 3/2001 | Moden | |
| 6,208,516 B1 | 3/2001 | Fangonilo et al. | |
| 6,222,742 B1 | 4/2001 | Schlecht | |
| D442,913 S | 5/2001 | Nagahara et al. | |
| 6,232,562 B1 | 5/2001 | Kikuchi et al. | |
| D464,317 S | 10/2002 | Tomioka | |
| D465,199 S | 11/2002 | Tomioka | |
| D466,076 S | 11/2002 | Nagashima et al. | |
| 6,519,163 B1 * | 2/2003 | Yoshimoto et al. | 363/21.01 |
| 6,545,890 B2 | 4/2003 | Pitzele | |
| 6,567,284 B2 | 5/2003 | Huang | |
| 6,577,109 B2 | 6/2003 | Dancy et al. | |
| 6,594,159 B2 | 7/2003 | Schlecht | |
| 6,646,895 B1 * | 11/2003 | Jacobs | 363/21.8 |
| 6,731,514 B2 | 5/2004 | Evans | |
| 6,731,520 B2 | 5/2004 | Schlecht | |
| 6,894,468 B1 | 5/2005 | Bretz et al. | |
| 6,896,526 B2 | 5/2005 | Pitzele | |
| 6,927,987 B2 | 8/2005 | Farrington et al. | |
| 7,005,146 B2 | 2/2006 | Lee | |
| 7,035,119 B2 * | 4/2006 | Koike | 363/19 |
| 7,050,309 B2 | 5/2006 | Farrington | |
| 7,072,190 B2 | 7/2006 | Schlecht | |
| 7,085,146 B2 | 8/2006 | Pitzele | |
| 7,119,524 B2 | 10/2006 | Bretz et al. | |
| 7,269,034 B2 | 9/2007 | Schlecht | |
| 7,272,021 B2 | 9/2007 | Schlecht et al. | |
| 7,272,023 B2 | 9/2007 | Schlecht | |
| 7,304,867 B2 * | 12/2007 | Usui | 363/21.06 |
| 7,333,535 B2 | 2/2008 | Redfern | |
| 7,345,891 B2 | 3/2008 | Barsun et al. | |
| 7,417,861 B2 | 8/2008 | Kikuchi et al. | |
| 7,558,083 B2 | 7/2009 | Schlecht | |
| 7,564,702 B2 | 7/2009 | Schlecht | |
| 7,696,733 B2 * | 4/2010 | Osaka | 323/267 |
| 7,765,687 B2 | 8/2010 | Pitzele et al. | |
| 7,787,261 B2 | 8/2010 | Farrington et al. | |
| 2002/0131258 A1 | 9/2002 | Inoue et al. | |
| 2003/0057548 A1 | 3/2003 | Hartke et al. | |
| 2004/0207459 A1 | 10/2004 | Farkas et al. | |
| 2004/0259434 A1 | 12/2004 | Pitzele | |
| 2005/0007082 A1 | 1/2005 | Bretz et al. | |
| 2005/0094356 A1 | 5/2005 | Onizuka et al. | |
| 2005/0110559 A1 | 5/2005 | Farkas et al. | |
| 2005/0189566 A1 | 9/2005 | Matsumoto et al. | |
| 2006/0044762 A1 | 3/2006 | Kikuchi et al. | |
| 2006/0164811 A1 | 7/2006 | Maxwell et al. | |
| 2006/0284308 A1 | 12/2006 | Harada et al. | |
| 2008/0304299 A1 * | 12/2008 | Bormann | 363/89 |
| 2009/0097289 A1 * | 4/2009 | Schetters | 363/84 |
| 2010/0091526 A1 | 4/2010 | Schlecht | |

OTHER PUBLICATIONS

Jitaru; "Constant Frequency Zero Voltage PWM Converters"; Power Conversion; Apr. 1992 Proceedings; pp. 428-439.

"Dual-Channel Digital Isolators, Enhanced System-Level ESD Reliability"; Analog Devices, Inc., Norwood, MA; 2007; 20 pp.

"Low-Power Dual Channel Digital Isolators"; Texas Instruments, Inc., Dallas, TX; SLLSE45B—Dec. 2010; 19 pp.

* cited by examiner

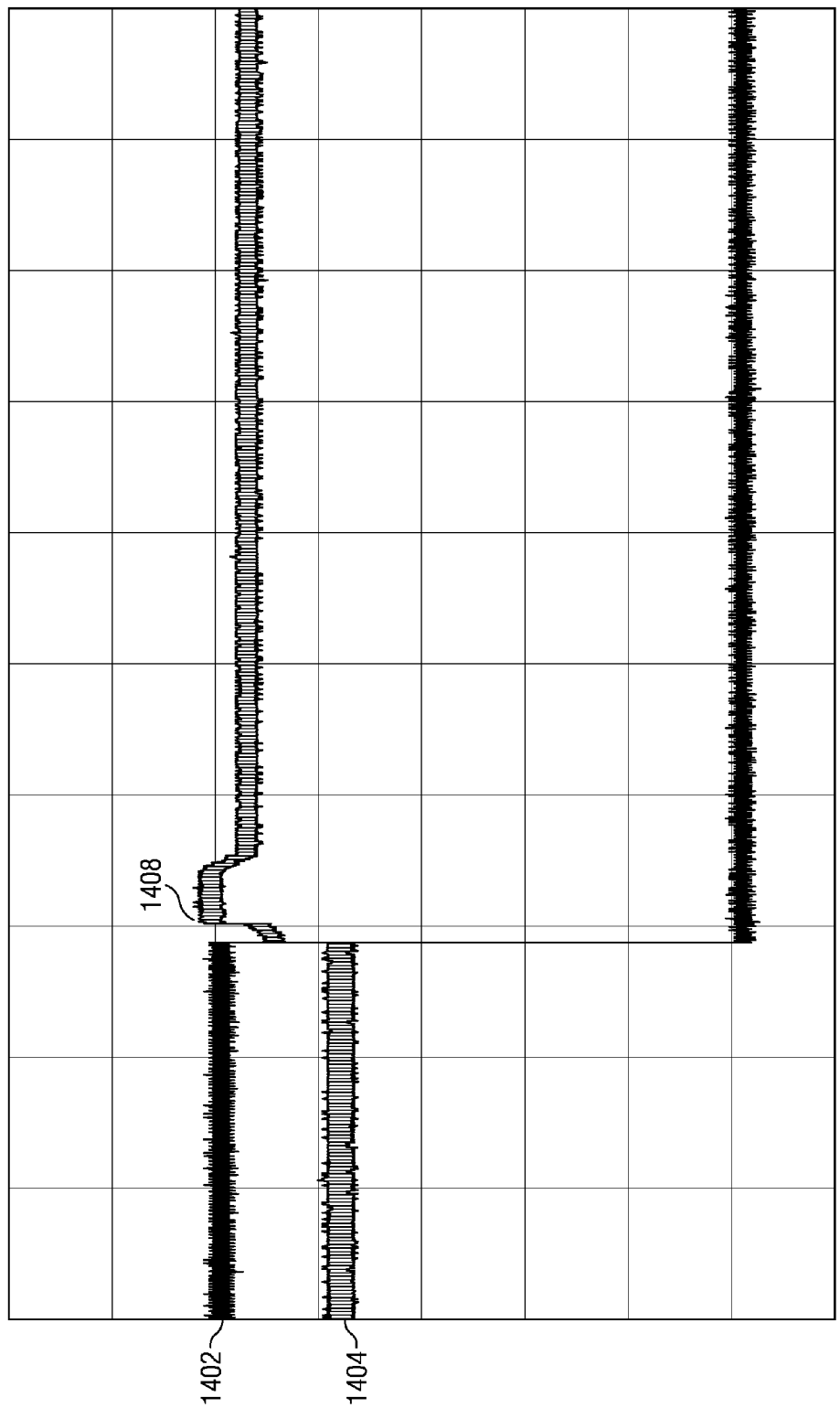

US 8,934,267 B2

LOOSELY REGULATED FEEDBACK CONTROL FOR HIGH EFFICIENCY ISOLATED DC-DC CONVERTERS

CROSS-REFERENCE TO RELATED APPLICATIONS

This application claims the benefit of provisional patent Application No. 61/411,672, titled "Adaptive Adjustable Regulation Control for High Efficiency Isolated DC-DC Converters," filed Nov. 9, 2010.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to DC-DC converters and, more specifically, to regulation control systems and methods for such converters.

2. Description of Related Art Including Information Disclosed Under 37 CFR 1.97 and 1.98

Driven by faster processors and various silicon chip speeds, the voltage required to power such chips is steadily declining. In the modern telecommunication networks, wireless communication systems, computing and data storage systems, various voltage levels (also called rails) are needed to power various processors, memory chips, application specific IC (ASIC) chips for the best performance. Also, the dc-dc converter power modules required to power the chips may need to be located as close to the chips as possible in order to provide fast load transient response. These non-isolated dc-dc converter modules are referred as Point-of-Loads (POLs).

Over the last two decades, the power electronics industry has managed to significantly improve the power conversion efficiency of the dc-dc converters and POLs thanks to new silicon devices, better ferrite core material, packaging design, and most importantly, the conversion system architecture—the distributed power architecture (see FIG. 1).

A traditional distributed power architecture (DPA) block diagram is shown in FIG. 1. As shown, the AC power (single phase or 3 phases) is converted into a regulated DC voltage, normally at −48V first. This −48V bus is usually isolated from the ac side. A battery bank is connected to the −48V bus to provide the required power back-up in case of ac power failure for critical telecomm, datacomm, and wireless systems. In some cases, where high service availability is not required, then the battery bank can be omitted to save cost and space.

An isolated intermediate bus dc-dc converter (IBC) is inserted between the −48V bus and the point-of-load (POL) dc-dc converters to convert −48V to either regulated 12V or 9.6V or 5V low voltage bus or unregulated 12V, 9.6V or 5V bus since typical POLs operate from either 4.5V to 14V input range or 2.4V to 5.5V input range. The intermediate bus converter can be a fully regulated dc-dc converter or semi-regulated converter or an unregulated converter since the output voltage regulation can be done by various POL converters.

The non-isolated, but fully regulated POL converters then convert the bus voltage to even lower voltage rails to power various required loads such as microprocessors, digital signal processor (DSP), amplifiers, application specific IC chips (ASIC), serial communication devices, etc. Usually, POL converters will achieve the highest efficiency at lower end of input voltage range while the conversion efficiency of the intermediate bus converter (IBC) maximizes at higher output voltage such as 12V. A trade-off needs to be made to select the IBC output voltage in order to achieve the best system level efficiency.

In a modern switch-mode dc-dc converter, the pulse-width modulation technique is used to regulate the converter output voltage. In the case of a full bridge converter (see FIG. 2), when the switch(es) turn on, the input power is delivered (or transferred) to the output side (or secondary side). The switching pulse-width can also be referred to as duty cycle of the switching, and is defined as switch on-time divided by the switching cycle period. The higher the duty cycle, the longer the switch conducting interval, and hence, the more input power is transferred to the output side providing that the switching frequency is constant. Usually when the output voltage is below the desired level due to load change the duty cycle is increased to raise the output voltage so that it stays at the desired level. When the line voltage drops, the output voltage will also dip. By increasing the duty cycle, the output voltage can be maintained.

From the power conversion efficiency point of view, the higher the duty cycle, the better the conversion efficiency. However, for a wide input voltage telecom power system, for example, the −48V bus voltage can vary from −36V to −75V (i.e. 2:1 ratio). Sometimes, it can be 18V to 75V or even wider. The wide range of the input voltage requires the transformer turns ratio to be chosen so that the converter maintains the regulation at minimum input voltage with some voltage margin for the converter internal impedance associated losses. As a result, the converter will have increased primary side current due to low transformer turns ratio and too much voltage available when the input voltage is at highest point. This applies very high voltage stress to the secondary side FETs so that higher voltage rated FETs need to be used (i.e. less efficiency) and requires the converter to operate at very small duty cycle in order to maintain the regulation for a given output voltage. The increased current in the primary winding and power switching FETs also leads to higher conduction and greater switching losses. Each of these drawbacks causes the dc-dc converter to have lower overall conversion efficiency and requires greater effort to remove the heat that is generated.

In the case of narrow input voltage range applications such as computing and data storage systems, or when the −48V bus is well regulated and not required to have a battery back-up, the intermediate bus converter can be designed differently. Such IBCs can utilize optimal transformer turns ratios and can be operated at nearly fixed duty cycle while allowing the output voltage to vary as the input line voltage and/or output load changes. This is possible because the downstream POL converters can accept wide input voltage range, i.e. 4.5V to 14V, and provide their own regulation for the chip load. This unregulated IBC allows nearly continuous power flow from the input or primary side to the output or secondary side while maintaining the highest possible duty cycle and optimal transformer turns ratio, and hence, the lowest voltage rated secondary switching FETs and the highest conversion efficiency. The concept of fixed duty cycle isolation stages (sometimes referred to as "DC transformers") combined with switching post regulators (or POLs) has been well known in the industry for decades.

Traditional isolated bus converter designs often include non-regulating isolated full bridge converters followed by several non-isolated post-regulators or non-isolated POLs converters. These full bridge dc-dc converters, such as that shown in FIG. 3, typically operate at approximately 50% fixed duty cycle during the normal and/or steady state operation. The duty cycle is reduced during the non-normal operating states such as during converter start-up or when a current limit is reached. The drawback of this scheme is the wide range variation of the output voltage of the non-regulated isolation stage, especially when the input voltage range is slightly wider such as, for example, 36V to 55V. The output voltage can drop too low, allowing the POLs to draw excessive current from the isolation stage. Consequently, an excessive resistive loss is encountered on the customer printed wiring board (PWB) due to the heavy current in the 12V (nominal) DC distribution bus (or $I^2R$ loss). This prevents effective use of such a design in high-power applications.

Another traditional dc-dc converter system design consists of an isolation/semi-regulated forward converter stage followed by several non-isolated post regulators or POLs. In this design the control circuit senses a voltage in the forward converter primary transformer winding circuit to provide a feedback control signal without bridging the primary/secondary isolation barrier. However, because the output voltage is not directly sensed, the output voltage drops as the load current increases due to the impedance of the dc-dc converter.

Although the duty cycle of the forward converter can be slightly adjusted by sensing the primary transformer winding circuit, the output voltage of the isolation stage is still subject to droop. If the input voltage range is relatively wide such as 36V to 75V, the output voltage can vary excessively depending on the main transformer turns ratio. Moreover, the resulting output could be so low at 36V input that it would NOT be suitable for high power application due to heavy current loss in the 12V (nominal) DC distribution bus (i.e., $I^2R$ loss).

FIG. 4 presents a graph showing the relationship of the output voltage (Vo) with respect to input voltage (Vin) in an unregulated converter. As shown, the output of such unregulated (402) converters can also be quite high at 75V input such that the output voltage could potentially exceed the downstream POLs input voltage ratings. At a minimum, this high voltage can cause the POLs to operate at quite low conversion efficiency due to very low operation duty cycle and high voltage stress on the switching device. As shown on the graph, unregulated converters do not sense the output voltage, duty cycle is not controlled during normal operation, and the circuit does not control the output voltage toward a predefined value, especially during the output load step change (or load dump). The output voltage swings high during such a transient and the voltage over-shoot level depends on the converter output inductance, the load change slew rate, and the capacitance used in the output of the converter. Similarly, semi-regulated converters do not sense output voltage, but, rather, sense a voltage in the primary winding circuit to infer the output voltage (Vo). Semi-regulated converters also do not have load regulation capability, especially during the output load step change (or load dump). The output voltage swings high during such transients, as depicted. The voltage overshoot level also depends on the converter output inductance and the capacitance used in the output.

Another known control scheme creates a quasi-regulated converter. FIG. 5 depicts the relationship of the output voltage (Vo) with respect to input voltage (Vin) in a quasi-regulated converter. Quasi regulated converters, as shown, display a region of unregulated operation before and/or after changing modes from regulated or semi-regulated to unregulated. One such design is disclosed in U.S. Pat. No. 7,787,261. The design in this patent is based on a converter that senses only the primary source voltage during the quasi-regulation stage, and fixes the duty cycle of the primary during the unregulated stage. No feedback is provided from the output to the primary circuit, and feedback is not utilized at all during the unregulated stage.

The most common method for using feedback control to tightly regulate converter output is by use of the sensed output voltage signal from the converter output side (or secondary side cross the primary secondary boundary when there is an isolation). FIG. 6 depicts such an arrangement. As depicted, the secondary side output voltage (Voutput) is measured and compared with a precision reference signal (Vref) generated by a costly precision voltage reference chip. The output voltage is then fed to the voltage regulation error-amplifier (U2) to compare with the reference voltage, Vref. The error amplifier, together with various loop compensation circuitry (C2, C3, R13, R15, and C4) are used to regulate the output voltage to achieve regulation accuracy and fast dynamic load response. The output of the error amplifier (U2) is an error signal representing the desired control or regulation intensity (or degree). This error signal is commonly sent to the primary side via an optocoupler (U1). The PWM (pulse-width-modulation) controller at the primary side uses this error signal to regulate the output voltage against the input voltage variation and the output load current variation. Such a feedback control design is exceedingly costly due to the precision components required, and requires substantial amounts of board space due to the large number of discrete components necessary for its implementation.

FIG. 7 depicts another conventional output voltage sensing and feedback scheme that crosses the primary/secondary boundary. This design provides a tightly regulated output (Voutput) as in the design depicted in FIG. 6, but with a shunt regulator (U2) instead of the costly precision reference chip and low offset op-amp of FIG. 6. Regulation may be improved by adding a small capacitor (C2) or a resistor and a capacitor series circuit (R3 and C2) between Vref and the shunt regulator cathode (U2). However, these components, likewise, tend to be relatively costly and bulky in terms of printed wiring board (PWB) space, especially for the POLs load where the tight regulation is not always necessary.

FIG. 8 depicts a graph of the output voltage (Vo) with respect to input voltage (Vin) using a tightly regulated feedback control scheme as depicted in FIGS. 6 and 7. The converter is designed so that for a chosen transformer turns ratio, it can still regulate the output voltage at the pre-defined value with better than +/−3% regulation tolerance over all specified input line, output load, and temperature operating conditions. Turns ratio is defined as Np/Ns, the number of primary turns divided by the number of secondary turns. Again, such designs lead to a small transformer turns ratio, which generates a high primary side current flowing through the transformer winding and the power switching devices, and hence, a relatively poor conversion efficiency. It also applies a high voltage stress to the converter secondary side synchronous rectifier devices, which requires a higher voltage rating device, and hence, the higher the conduction loss and the body diode reverse recovery loss. Furthermore, it requires either an expensive shunt regulator or a precision reference chip and low offset high bandwidth op-amp to achieve this accurate set point control and tight regulation. Since it is difficult to make a fractional turn transformer design, the choice of the transformer turns ratio is limited. For the step-down type of telecomm converter design where a typical source voltage range is from 36V to 75V, the transformer turns ratio is normally an N to 1 design. N can be an integer number such as 2, 3, 4, 5, 6, 7, and 8, etc. depending on the transformer core cross-section area to avoid the core saturation. TDK Innoveta iFA series full brick converter module designed and rolled out in 2001 gives a good example. To utilize the highest possible turns ratio design without losing the output regulation at low end of input source voltage, a 8 to 3 turns ratio was chosen. The converter maintains better than +/−3% tight regulation between 38V to 75V input while allows slightly loose regulation between 36V and 38V. As discussed above, tightly regulated converters are not required for POL loads in today's distributed power architecture.

What is needed is a control scheme that senses the output voltage directly and, in a low-cost way, loosely regulates the output voltage to meet the POL load requirement. Furthermore, this new scheme should utilize a large transformer turns ratio (for instance, N≥4 for a 36V to 75V input and output>8.3V telecomm bus converter system or N≥5 for a 51V to 60V input and output>9.6V bus converter system) to achieve greater conversion efficiency by recognizing that a tightly regulated output voltage is NOT required for POL loads

BRIEF SUMMARY OF THE INVENTION

A first embodiment of the present invention includes an isolated dc-dc converter device, the device comprising: a primary side circuit and a secondary side circuit, the primary side circuit accepting an input voltage, the secondary side circuit galvanically isolated from the primary side circuit, the secondary side circuit for generating an output voltage, the secondary side circuit output voltage for use by at least one point-of-load device; and an output voltage feedback circuit including a signal coupling device and controller, the feedback circuit further configured to loosely regulate the output voltage in response to changes in input voltage.

Another embodiment includes an isolated dc-dc converter device, the device comprising: a primary side circuit having an input voltage; and a secondary side circuit for generating an output voltage for use by at least one point-of-load device, the secondary side circuit including an optocoupler device, the secondary side circuit configured to establish a loosely regulated output voltage regulation point based upon the output voltage, the optocoupler device generating a reflected output voltage in the primary side circuit in response to the secondary side regulation point, wherein the reflected output voltage is utilized by the primary side circuit to loosely regulate the secondary side circuit output voltage toward a pre-defined value.

Another embodiment includes an isolated dc-dc converter device, the device comprising: a primary side circuit including at least one primary transformer winding circuit, a plurality of primary switching devices for controlling current flow through the primary winding, a controller configured to provide a variable duty cycle signal for driving the switching devices, and a photosensor device in combination with a resistance device, the resistance device for generation of a reflected output voltage signal for use by the controller; and a secondary side circuit for generating an output voltage for use by at least one point-of-load device, the secondary side circuit including at least one secondary transformer winding inductively coupled to the primary winding, and a light emitter device in combination with a voltage divider circuit, the light emitter device in optical view of the photosensor device, wherein the secondary side output voltage causes the light emitter device to influence the photosensor device to effect generation of the reflected output voltage for use by the controller in adjusting the duty cycle of the primary switching devices.

Another embodiment includes an isolated dc-dc converter device, the device comprising: an optocoupler device including a light emitter and a photosensor; a primary side circuit including at least one primary transformer winding, a plurality of primary switching devices for controlling current flow through the primary winding circuit, a controller configured to provide a variable duty cycle signal for driving the switching devices, and a resistance device in the emitter circuit of the photosensor, the resistance device for generation of a reflected output voltage signal for use by the controller; and a secondary side circuit for generating an output voltage for use by at least one point-of-load device, the secondary side circuit including at least one secondary transformer winding inductively coupled to the primary winding, and a voltage divider forming a circuit with the light emitter, wherein the secondary side output voltage causes the light emitter device to influence the photosensor device to effect generation of the reflected output voltage for use by the controller in adjusting the duty cycle of the primary switching devices.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein:

FIG. 14E depicts the load dump transient response characteristics of the loosely regulated converter embodiment (9.6V output setting) with an input voltage of 54V;

Figure 1:
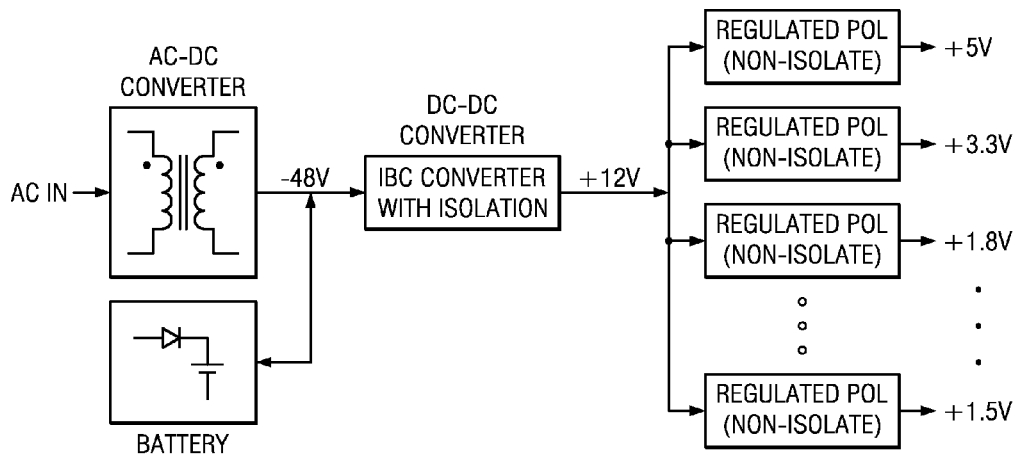
FIG. 1 depicts a block diagram of a Distributed Power Architecture (DPA) system design.

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood. (58,266).

DETAILED DESCRIPTION OF THE INVENTION

Figure 2:
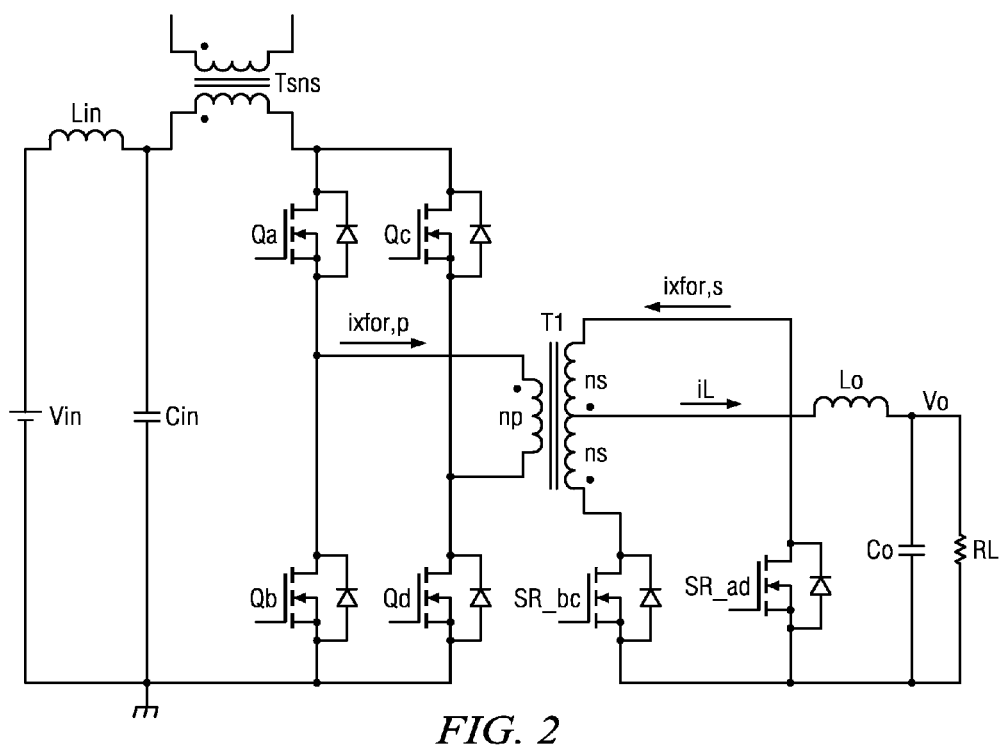
FIG. 2 depicts a traditional isolated full bridge DC-DC converter with synchronous rectification.
Figure 3:
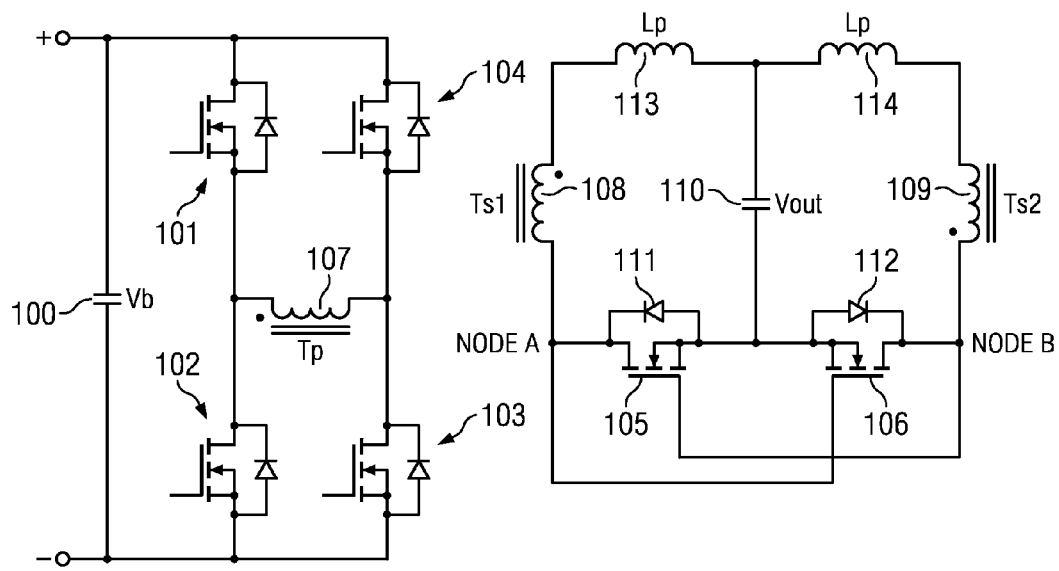
FIG. 3 depicts a traditional isolated full bridge DC-DC converter that operates with a fixed duty cycle (i.e., unregulated)
Figure 4:
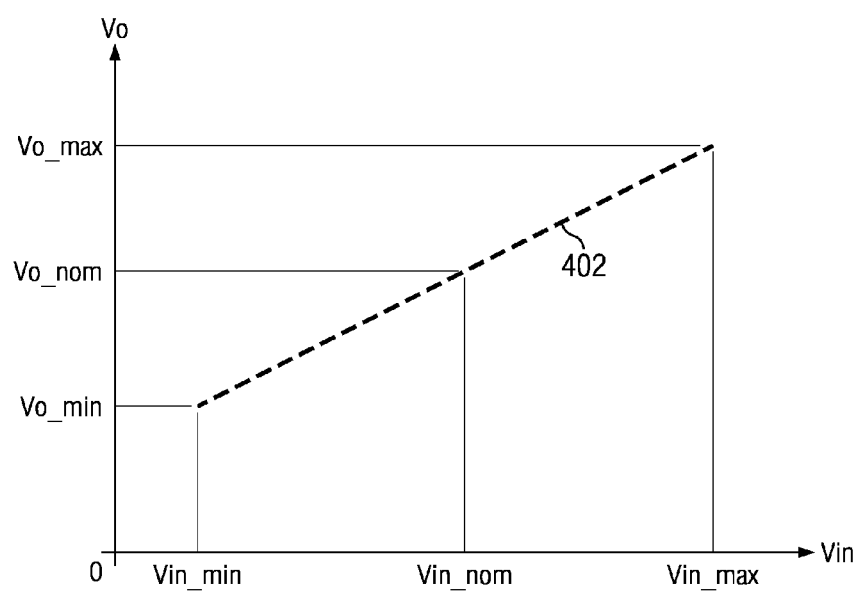
FIG. 4 depicts a graph of output voltage with respect to input voltage for a conventional unregulated converter design.
Figure 5:
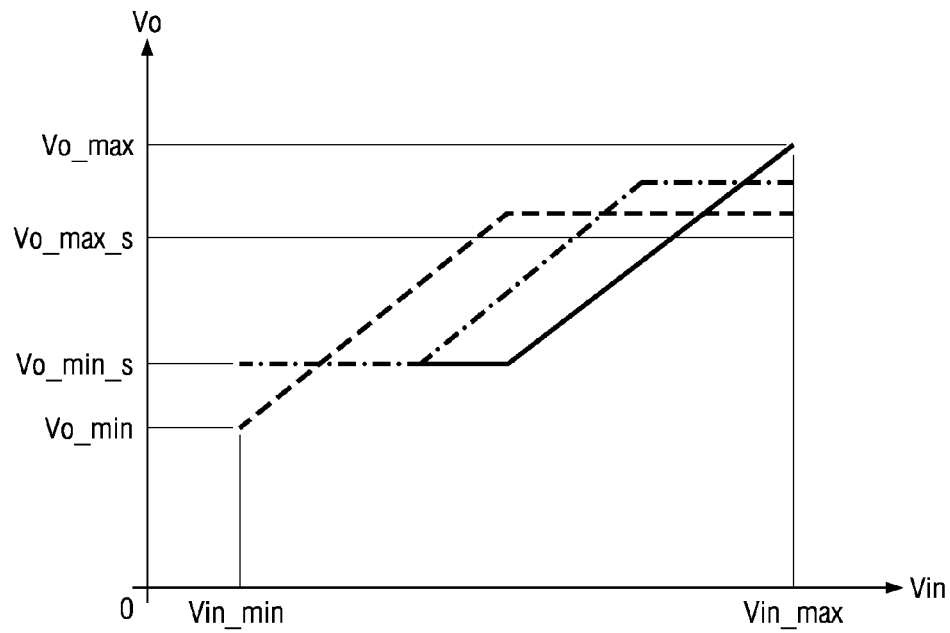
FIG. 5 depicts a graph of output voltage with respect to input voltage for a conventional quasi-regulated converter design.
Figure 6:
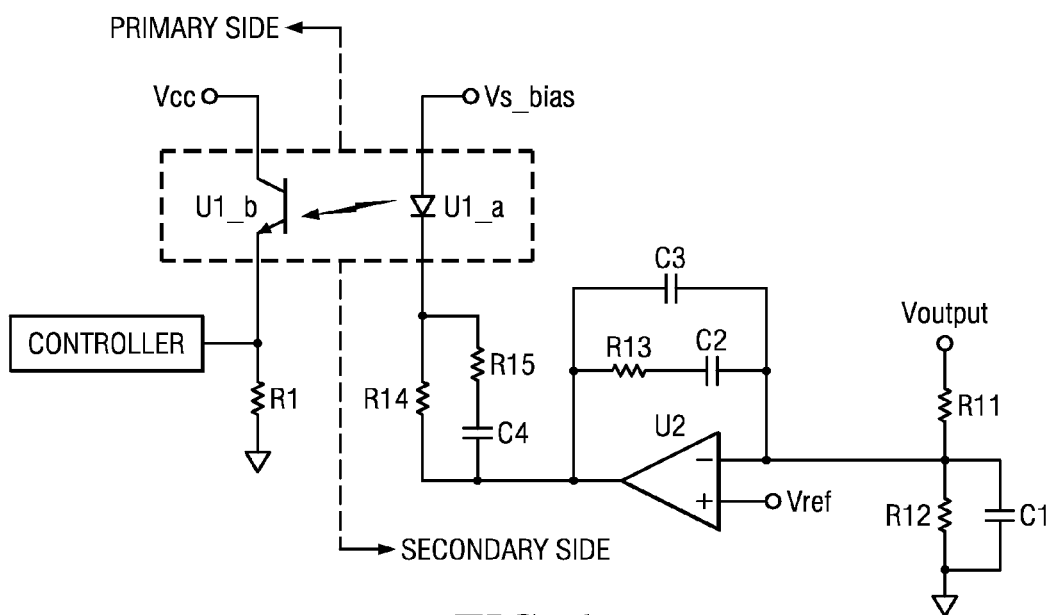
FIG. 6 depicts a conventional output voltage sensing and feedback control scheme that bridges the primary/secondary converter boundary, the scheme utilizing a precision voltage reference and op-amp comparator.
Figure 7:
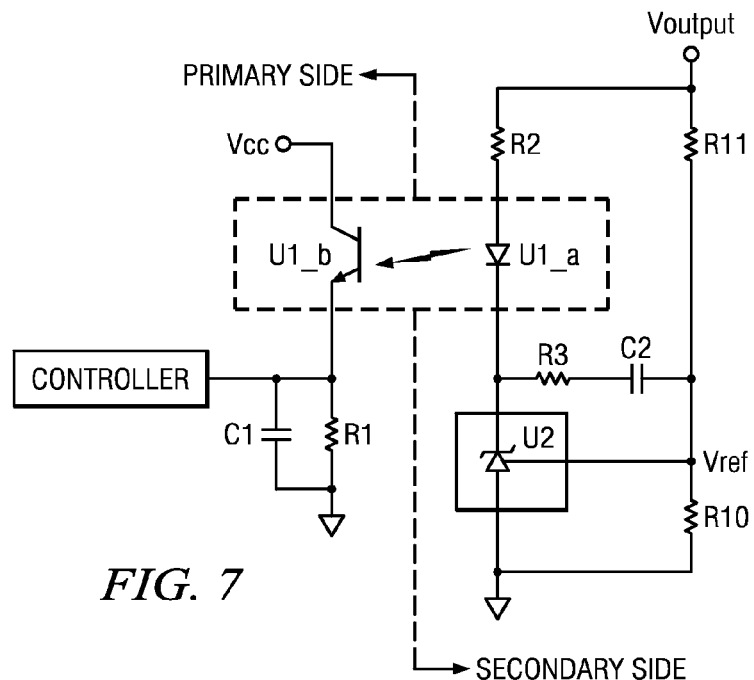
FIG. 7 depicts a conventional output voltage sensing and feedback control scheme that bridges the primary/secondary converter boundary, the scheme utilizing a shunt regulator arrangement.
Figure 8:
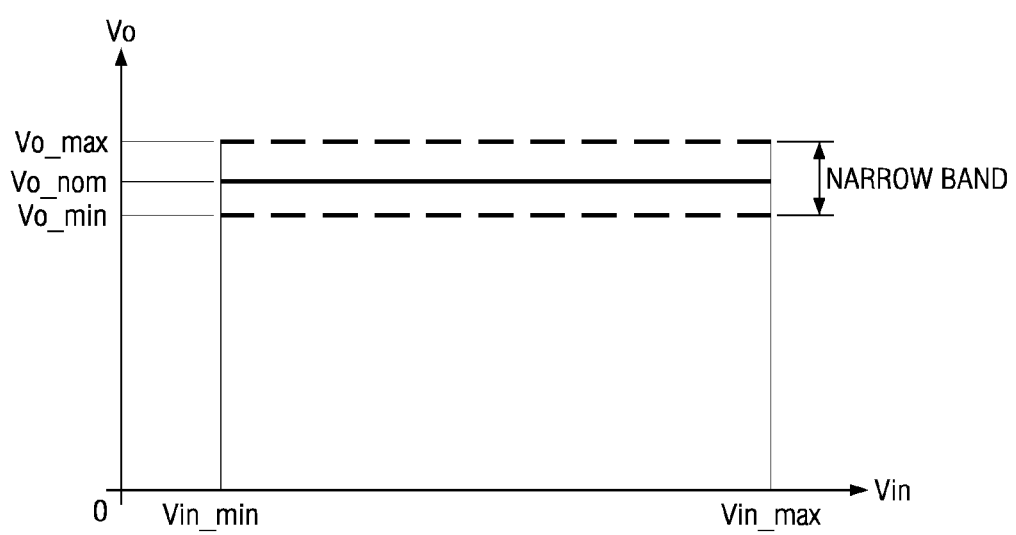
FIG. 8 depicts a graph of the output voltage with respect to input voltage for a conventional tightly-regulated feedback control scheme as depicted in FIGS. 6 and 7.

Again, FIG. 2 illustrates an isolated full bridge dc-dc converter with a synchronous rectification scheme at the secondary side to reduce the secondary side controllable rectifier device conduction losses during the rectifying interval and the freewheeling interval of the secondary side controllable rectifier device(s). The primary switching devices are controlled in a pair. When the diagonal pair devices, Qa and Qd, are turned on, the primary power is then delivered to the secondary side via the transformer T1 coupling. The primary current flows via the path of Qa top switch to the transformer primary winding to Qd bottom switch. The secondary current flow path is the center tap of the secondary windings of the transformer to the output inductor Lo, to the output capacitor bank Co and the load, and then via the secondary controllable rectifier device, SR_ad back to the secondary winding. To reduce the power loss of the secondary controllable rectifier device, SR_ad, the switch SR_ad is also turned on to achieve the synchronous rectification.

When the primary switching devices Qa and Qd are turned off, the energy stored in the output inductor Lo is released. This forces the inductor current to freewheel via the output capacitor bank Co, the body diodes of the rectifying devices SR_ad and SR_bc, and the transformer secondary windings. By turning on SR_ad and SR_bc, the freewheeling current conduction loss are minimized since the voltage drops across the secondary side FETs SR_ad and SR_bc are much lower than the voltage forward drops of the FETs body diodes.

When the other diagonal primary switching pair devices Qb and Qc are turned on, the main transformer T1 is reset and the input power is delivered to the secondary side again. The secondary side controllable rectifier SR_bc is then turned on to achieve the synchronous rectification.

By varying the duty cycle of the primary switching pair devices, the energy flow from the input side (primary side) to the output side (secondary side) can be balanced and hence the output voltage. A small time delay between the primary switch pair Qa and Qd turn-off (or turn-on) and the other switch pair Qb and Qc turn-on (or turn-off) is required to prevent the shoot-thru current from the input bus via the top switch to the bottom switch of the primary FETs. The maximum duty cycle of the primary switches is limited to 50%. For the best efficiency and the input and output ripple cancellation, the duty cycle is preferably a 50%, i.e. no regulation against input line and output load variation.

Figure 9:
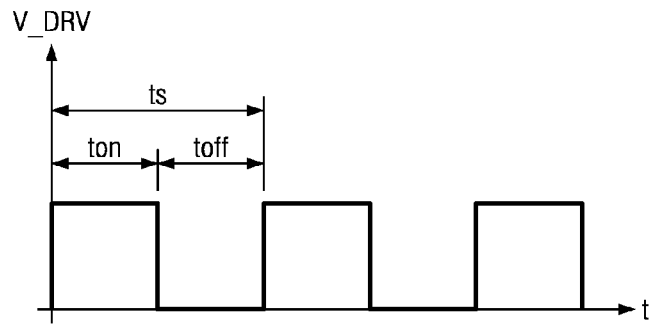
FIG. 9 depicts the portions of the traditional switching duty cycle waveform.

The definition of the duty cycle for a pulse-width modulated (PWM) DC-to-DC converter circuitry is illustrated in FIG. 9. The switching duty cycle is defined as the switch on-interval (or V_drv goes high), $t_{on}$, divided by the switch period $T_s$. The switching period $T_s$ is the sum of the switching conducting interval, ton, and the switch OFF interval, $t_{off}$. The switching frequency is defined as the reciprocal of the switching period, i.e. $f_s=1/T_s$. As a result, the switch duty cycle D can be written as follow:

$$D=t_{on}/T_s=t_{on}\times f_s \qquad \text{Math (1)}$$

For an un-regulated dc-dc converter, the switch turn-on time is fixed. It is not controlled based on any feedback measurement. Since the switching frequency is also fixed for the ease of design of the magnetic components and the noise filtering circuit, the switch duty cycle D is also fixed to approximately 50% for double ended converters such as half bridge and full bridge converters.

For a tightly regulated dc-dc converter, an output voltage sensing circuit is used to sense the output voltage. This sensing circuit then feeds back the sensed signal to an error amplifier, which compares this signal with the preset reference voltage so as to control the switch turn-on time. If the output voltage is below the desired preset reference voltage, an error signal is generated, which causes the controller to increase the switch turn-on time, ton, and hence to increase the switch duty cycle, D since fs is fixed. Alternatively, if the output voltage is higher than the desired voltage, a negative error signal will be generated to cause the controller to reduce the switch turn-on time, reducing D. In an ideal case, the output voltage transfer function of a full bridge converter can be written as follow:

$$Vo = 2(n_s/n_p) \times (t_{on}) \times Vin \times f_s \qquad \text{Math (2)}$$

where $n_p$ and $n_s$ are the number of turns of transformer T1, primary winding and secondary winding, respectively, and Vin is the input voltage. For a given design, $n_p$ and $n_s$ are constants.

Figure 10:
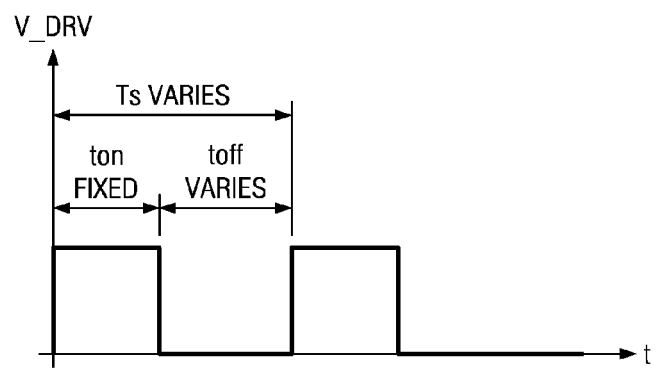
FIG. 10 depicts the switching duty cycle waveform as utilized in the disclosed embodiments.

In the proposed control scheme of FIG. 10, $n_p$, $n_s$, and $t_{on}$ are kept constant while the input voltage and the switch-off time interval are varied. Since the switching period $T_s = t_{on} + t_{off}$, the variation of $t_{off}$ will also change $T_s$. Furthermore, since $f_s = 1/T_s$, the variation of $t_{off}$ will change the switching frequency $f_s$. In order to maintain the output voltage Vo constant, the switching frequency may be varied in an opposite direction of the input voltage Vin [see Math (2) above]. In another embodiment, as the input voltage varies up and down, the primary switching devices switching period $T_s$ is changed accordingly so that the output voltage variation is minimized or even held constant. In yet another embodiment, the switch-off time interval (also switching frequency) is varied as the output load current changes. For a given input voltage, a higher load current requires a smaller $t_{off}$ time interval and consequently a higher switching frequency $f_s$.

Figure 11A:
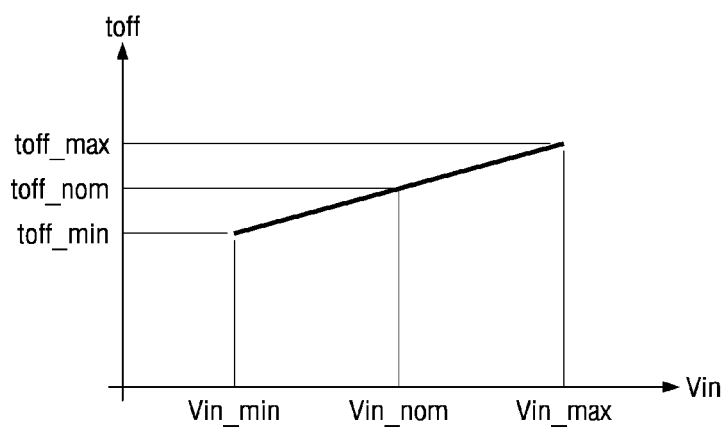
FIG. 11A is a graph depicting how the switching $t_{off}$ time may vary with input line voltage in an embodiment of the present invention.
Figure 11B:
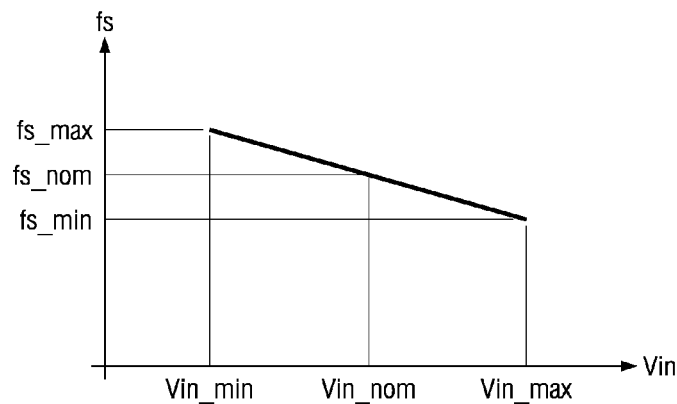
FIG. 11B is a graph depicting the relationship between the switching frequency and the input line voltage in an embodiment of the present invention.
Figure 11C:
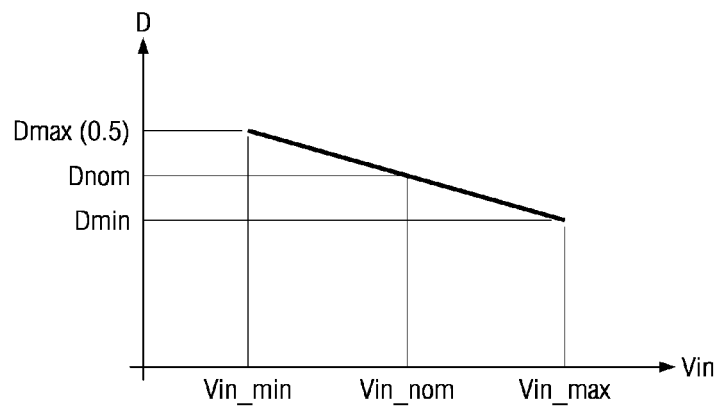
FIG. 11C is a graph depicting the relationship between switching duty cycle and the input line voltage in an embodiment of the present invention.
Figure 11D:
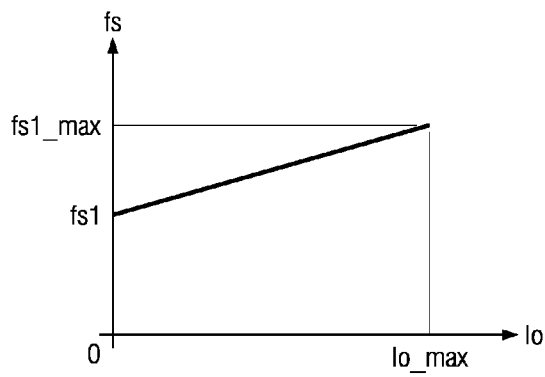
FIG. 11D is a graph depicting the relationship between the switching frequency and the load current when switch turn-on time is maintained constant.

FIG. 11A shows how the switch OFF-time, $t_{off}$, is varied as the input voltage changes. As the input voltage drops the switching period is also reduced. Since the switching frequency ($f_s = 1/T_s$) is the reverse of the switching period $T_s$, this is equivalent to the increase of the switching frequency. The relationship between the switching frequency and the input voltage changes is depicted in FIG. 11B. The switch duty cycle vs. the input voltage is shown in FIG. 11C. For double-ended dc-dc converters such as push-pull, half-bridge, and full bridge converters, the max duty cycle is limited to 50% (ideally). For the single ended converters, the duty cycle can be as high as 100%. The relationship between the switching frequency and the load current is shown in FIG. 11D while the switch turn-on time is kept constant.

Figure 12A:
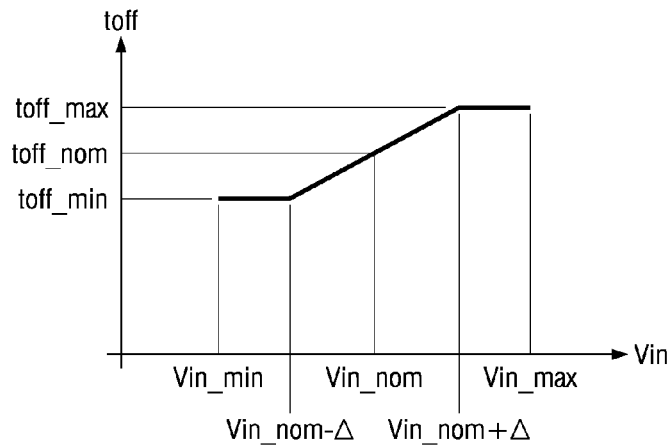
FIG. 12A is a graph depicting the relationship between $t_{off}$ and input line voltage in an embodiment of the present invention.

A variation of the proposed scheme is illustrated from FIG. 12A to FIG. 12D. FIG. 12A shows that the switch OFF_time, $t_{off}$, only varies with the module input voltage in a reduced range, from Vin_nom−Δ to Vin_nom+Δ. At Vin_nom+Δ, $t_{off}$ reaches its max value, toff_max. As Vin continues to increase, $t_{off}$ stays at toff_max. The same is true for toff_min variation because it reaches its minimum value at Vin_nom−Δ.

Figure 12B:
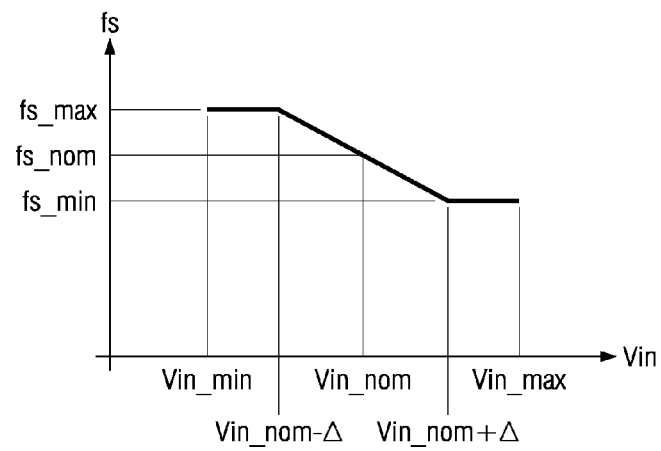
FIG. 12B is a graph depicting the relationship between switching frequency and the input line voltage in an embodiment of the present invention.
Figure 12C:
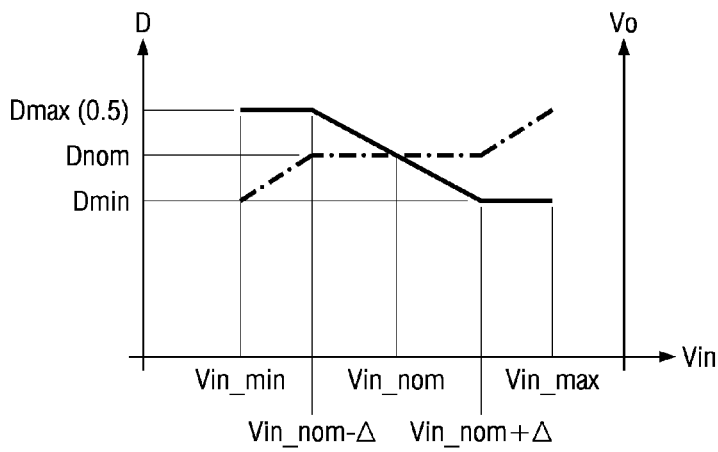
FIG. 12C is a graph depicting the relationship between duty cycle, output voltage, and input voltage in an embodiment of the present invention.
Figure 12D:
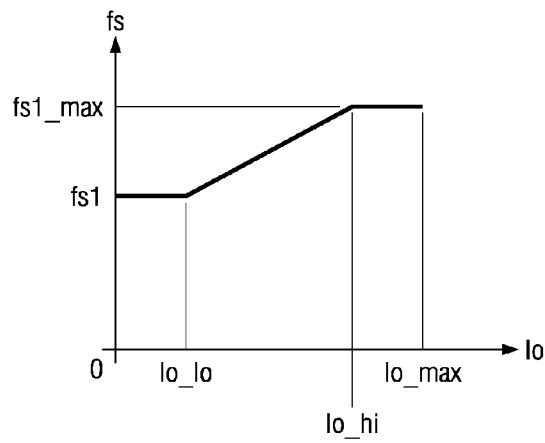
FIG. 12D is a graph depicting the relationship between switching frequency and output load current in an embodiment of the present invention.

The control scheme is further explained in FIGS. 12B, 12C, and 12D. FIG. 12C shows that as the input voltage increases, the output voltage can be fully regulated at a fixed level in the input voltage range between Vin_nom−Δ and Vin_nom+Δ. FIG. 12D shows that the switching frequency can vary with the load to improve the module efficiency at light load while still limiting the transformer volt-seconds.

Figure 13A:
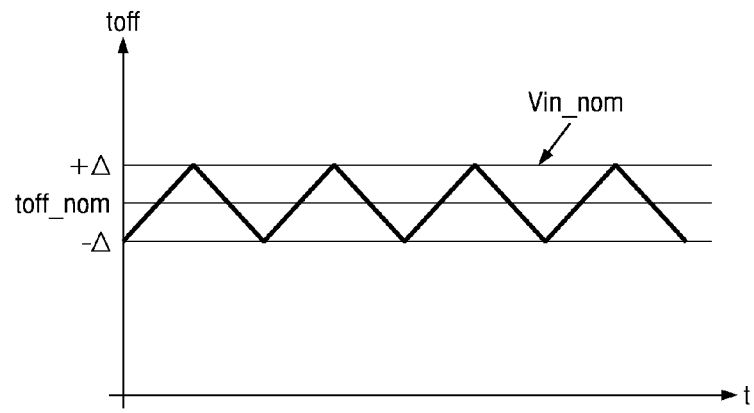
FIG. 13A is a graph depicting $t_{off}$ over time when the switching frequency is dithered.
Figure 13B:
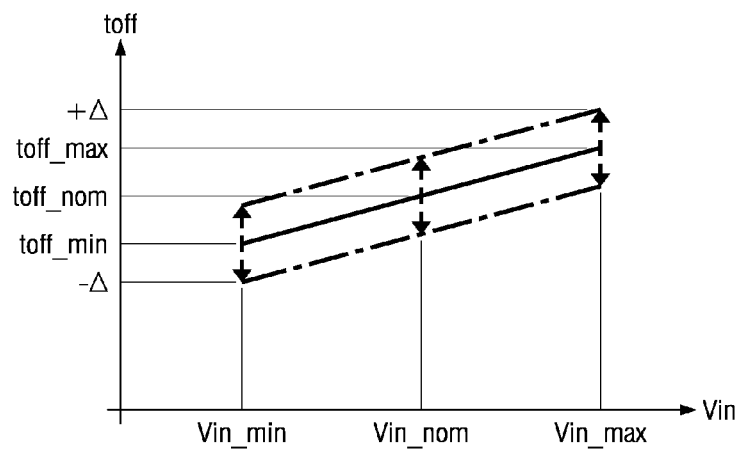
FIG. 13B is a graph depicting the relationship between $t_{off}$ and input line voltage when the switching frequency is dithered.

Another variation of this proposed new control scheme is shown in FIG. 13A and FIG. 13B. The idea is to create a small $t_{off}$ tolerance band, 2Δ, or switch-off time dithering or switching frequency dithering band, where the actual $t_{off}$ will be varied (or modulated or dithered) from $t_{off}-\Delta$ to $t_{off}+\Delta$ and then back to ($t_{off}-\Delta$) with the time at a given fixed frequency or variable frequency (see FIG. 13A). The $t_{off}$ tolerance band width (or modulation band width or the dithering band width) can be adjusted and so is the $t_{off}$ variation frequency. The trajectory of $t_{off}$ variation (or modulation or dithering) can be a triangular shape or sine-wave shape, or saw-tooth shape, etc.

FIG. 13B depicts the tolerance band control scheme for a given input voltage range from Vin_min to Vin_max. When the input voltage Vin is fixed, $t_{off}$ is then operated at a given value based on FIG. 11A or FIG. 12A. On the top of that, $t_{off}$ is then modulated or dithered from ($t_{off}-\Delta$) to ($t_{off}+\Delta$). Since $t_{off}$ varies all the time (i.e. switching frequency varies all the time) even at a fixed input voltage, this proposed control scheme differs from those claims or teachings where both the duty cycle and $t_{off}$ time (also $t_{on}$ time) are kept constant during normal operation.

Figure 14A:
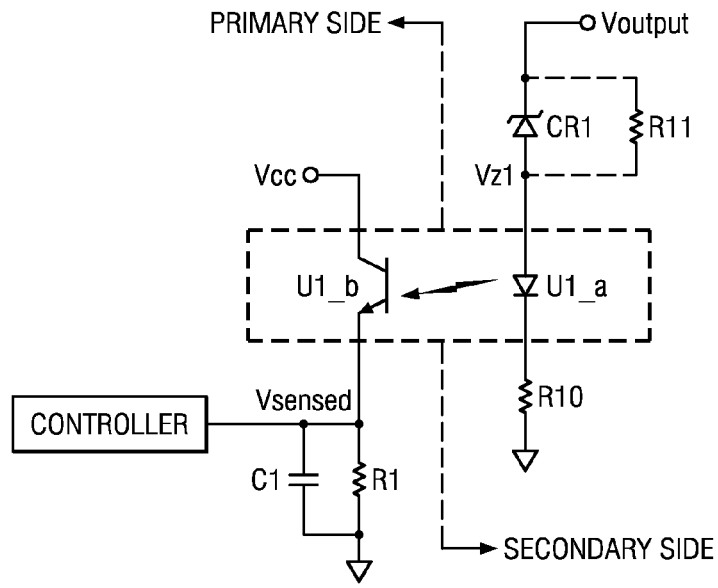
FIG. 14A depicts a first embodiment of the loosely-regulated feedback circuit of the present invention, showing alternate components for further smoothing response.

FIG. 14A depicts a first embodiment. This embodiment uses an output voltage sensing circuit that bridges the primary/secondary isolation boundary. This output voltage sensing circuitry senses the secondary isolated output voltage and then feeds back the signal, which is proportional to the output voltage to be regulated to the primary side for the primary side voltage controller (either analog or digital) to loosely regulate the output voltage to a pre-defined value. The loosely regulated converter allows overall converter regulation tolerance to be relaxed, taking advantage of the wide input capability of the POL regulators which serve as a load. For example, while a regulated or semi-regulated converter typically offers line regulation tighter than 0.5% of Vout, "loosely regulated" and "loose regulation" as defined herein means that the line regulation is 2% or greater of Vout.

This embodiment of the sensing circuitry consists of two resistors (R1 and R10), a Zener diode (CR1), and an optocoupler (U1), the optocoupler having a light emitter (U1_a) and a photosensor (U1_b) to optically isolate the primary side from the secondary side. Although an optocoupler secondary side circuit to primary side circuit (secondary-to-primary) signal coupling device is expressly depicted, other embodiments may utilize a linear isolator based on magnetic coupling technology, capacitive coupling, differential mode amplifier technology, or the like. As another example, it is possible to utilize commercially available isolators including, but not limited to, the Texas Instruments ISO7421E or Analog Devices ADuM3210 device as a signal coupling device. Such signal coupling devices are within the scope of the claims herein.

In yet another embodiment a voltage controlled oscillator (VCO) is used to convert a voltage signal to a digital pulse train. In this embodiment, a higher sensed voltage causes the pulse train frequency to increase (i.e higher frequency). An optocoupler or other signal coupling device may then be used to transfer the digital pulse trains across the primary/secondary boundary. In this embodiment the digital controller senses the pulse train and, based upon the pulse train, calculates the frequency and converts it to a reflected voltage signal.

Referring again to FIG. 14A, the Zener voltage (Vz1) determines the predefined output voltage regulation point. Low cost, wide tolerance components can be used. Neither the precision reference chip nor the low off-set op-amp is needed in this novel design. In another embodiment, a resistor (R11) replaces the zener diode to provide a voltage divider circuit (R11 and R10) to establish the reflected output voltage at the primary (Vsensed). Such an embodiment provides yet looser regulation. A compromise, as in yet another embodiment, is the use of a resistor (R11) in parallel with the zener diode (CR1). Such a configuration de-sensitizes the reflected output voltage signal across the resistor (R1) (at primary side) by smoothing the zener voltage response. A small filtering capacitor (C1) can also be added across the primary side resistance (R1) to further smooth the reflected output voltage (Vsensed) response.

Figure 14B:
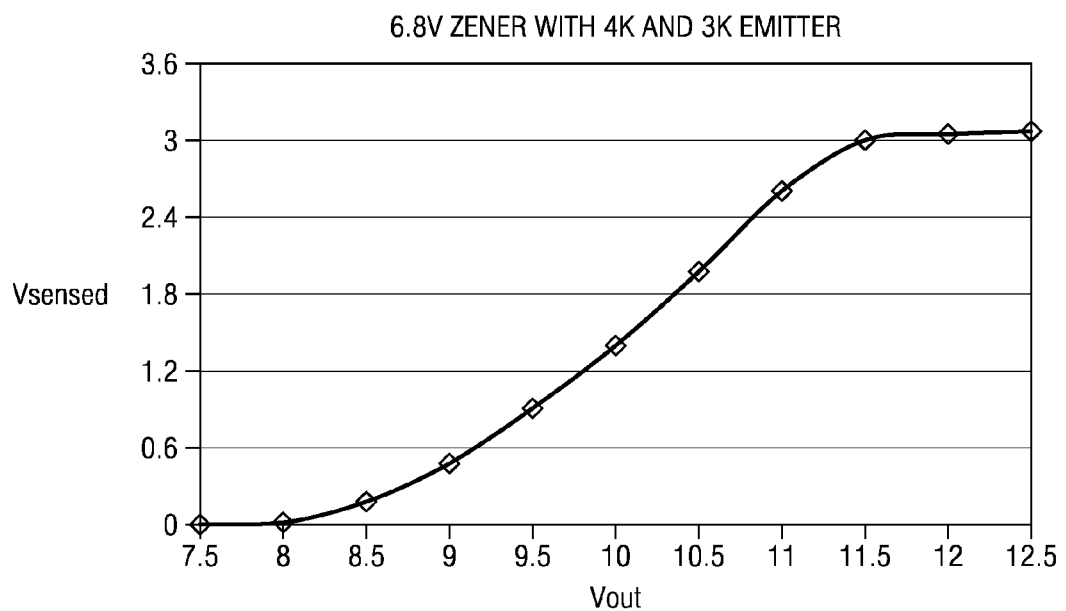
FIG. 14B depicts a graph of sensed voltage from the feedback circuit embodiment with respect to output voltage.

As depicted, this embodiment senses the output voltage via the zener diode (CR1) and resistor (R10) combination circuit, and feeds back the sensed voltage to the primary (controller) side using an optocoupler device (U1). A quasi-linear voltage curve, which is proportional to the output voltages, can be obtained at the controller side as shown in FIG. 14B. This graph reflects the sensed voltage (Vsensed) relative to the output voltage (Voutput) when the output feedback regulation loop is not closed. This scheme is different from the conventional feedback control scheme where the signal fed back to the controller side is the error signal of the output voltage (i.e. the difference between the pre-defined value and the measured output voltage) as shown and discussed previously. Because the feedback signal is NOT an error signal, neither the precision reference chip nor low off-set op-amp together with the supporting loop compensation circuitry is required.

As shown on the graph, with a 6.8V zener diode plus a 4K resistor in series with the optocoupler and an output voltage regulation set-point close to 9.6V, the sensed voltage (Vsensed) at the controller side (optocoupler transistor side) is approximately 1V. This analog voltage representing the output voltage reading (approximately 9.6V) is provided to the digital (or analog) primary controller. A digital controller (microcontroller or microprocessor) utilizes an analog-to-digital converter, which converts the analog signal to the digital signal (bits). A digital PI (proportion and Integration) or PID (proportion, integration, and differentiation) control loop or algorithm may then (based upon the Vsensed measure) be used to regulate the secondary side output voltage against the variations of the input voltage and load current within a specific desired band. In another embodiment, this sensed voltage signal (Vsensed) is also used for output overvoltage protection whenever the sensed voltage is higher than a pre-defined value, e.g. 2.6V, by causing a shutdown of the converter switching. The dynamic performance of the output voltage against the line and load change depends largely on the digital control loop design and scheme used for a given switching frequency, power train design, and the output capacitance. Similarly, in another embodiment utilizing an analog controller, the controller utilizes a high gain or integrating amplifier and PWM controller to control Vsensed to similar effect.

Figure 14C:
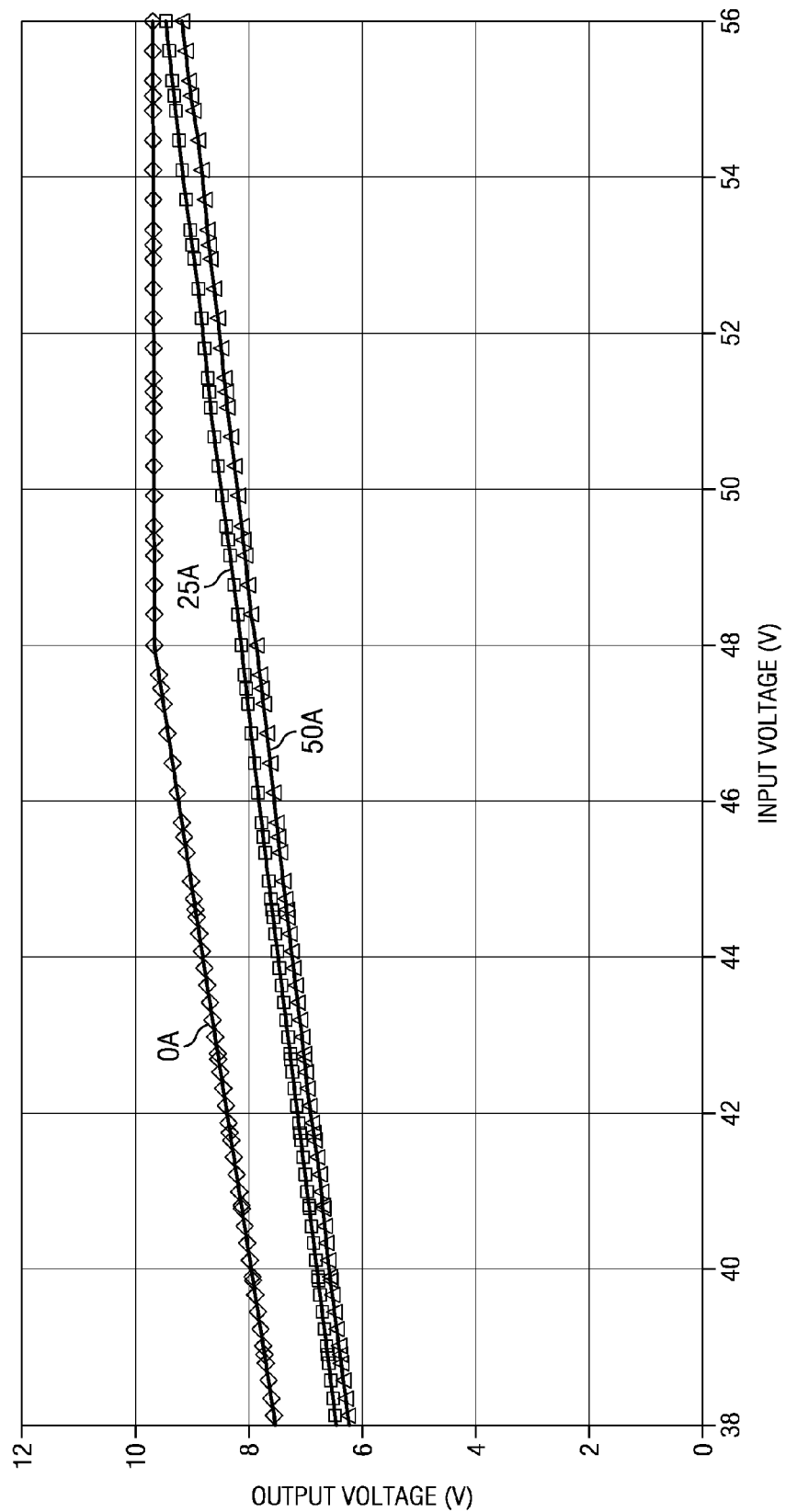
FIG. 14C depicts a graph of output voltage with respect to input voltage for the embodiment at differing load currents.

The typical line regulation characteristics of the proposed loosely regulated control scheme from a 9.6V output, 450 W converter is shown on the graph of output voltage (Vout) with respect to input voltage (Vin) depicted in FIG. 14C. As depicted, the loose regulation effect from 38 Vin to 56 Vin at various load current (0 A, 25 A, and 50 A) can be seen. For this particular case, a 5:1 transformer turns ratio was chosen and the output voltage was set at 9.6V while the load current was varied. Should the input source high end voltage be even higher, e.g. up to 75V, the regulation effect of this loosely regulated feedback control scheme is even more advantageous since the output voltage will be maintained at approximately 9.6V. The output voltage of an unregulated converter would be too high for the POLs even with a large transformer turns ratio such as 5:1.

Figure 14D:
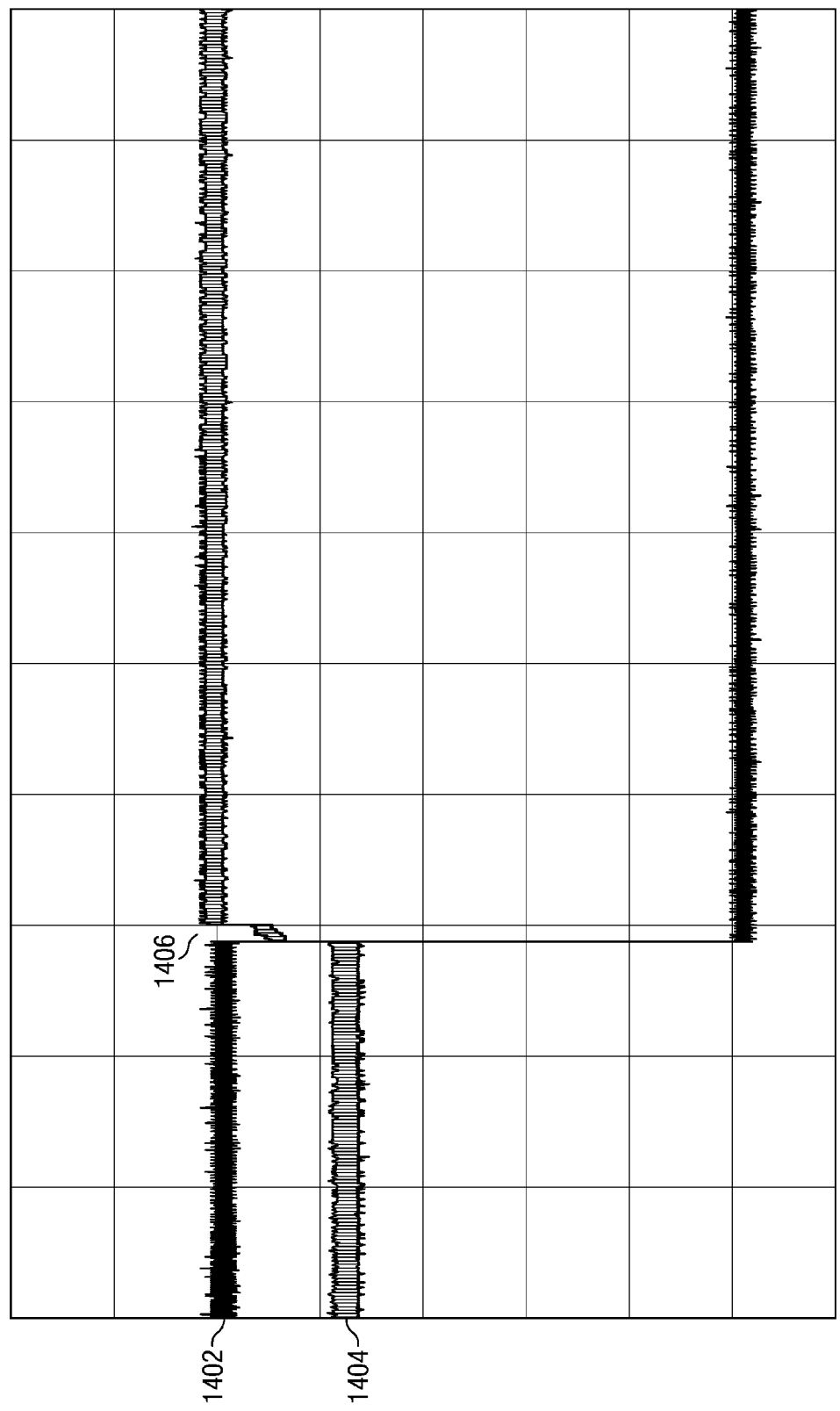
FIG. 14D depicts the load dump transient response characteristics of an unregulated converter (9.6V output setting) with an input voltage of 54V.
Figure 14F:
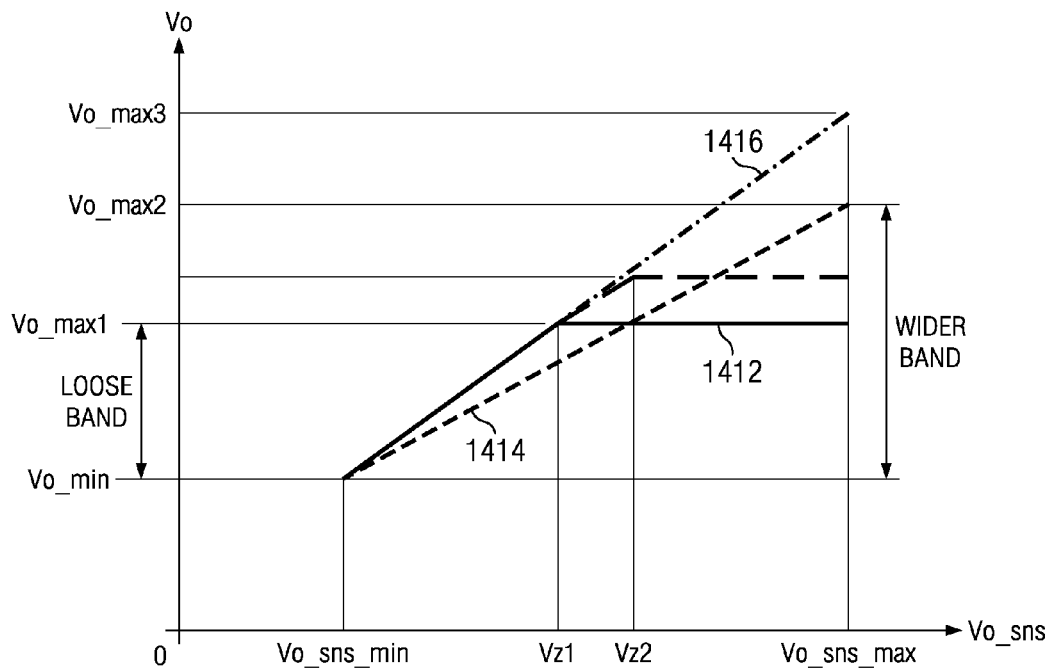
FIG. 14F depicts a graph of various output characteristics of the embodiment of the present invention, namely output voltage, sensed voltage, zener voltage, and regulation band width.

The typical output voltage regulation characteristics of the present embodiment of the proposed loosely regulated feedback control converter is further depicted in FIG. 14F. Three cases of operation are shown. To simplify the discussion, assume that the converter is ideal, i.e. lossless. The intermediate bus converter output voltage, Vo is therefore shown by the following equation:

$$Vo=(2D)\times Vin\times(n_s/n_p) \qquad \text{Math (3)}$$

where D is the switching duty cycle, Vin is the input voltage, and $n_s$ and $n_p$ are the main transformer secondary and primary number of turns, respectively. For given $n_s$, $n_p$, and D values, the output voltage reaches the maximum at Vin_max. With the addition of CR1 and the Zener voltage set at Vz1, the output voltage will reach the predetermined value at Vo=Vz1. In the first case (1412), the converter loosely regulates using a zener diode (CR1) with a voltage rating (Vz1) that equals the sensed output voltage (Vo_sns=Vz1).

Before Vo_sns (or Vsensed) reaches Vz1, the regulation loop commands maximum duty cycle to deliver the maximum possible power to the output to raise the output voltage. Once Vo_sns reaches the predefined set-point, Vz1, the duty cycle of the converter starts to pull back from the maximum in order to regulate the output voltage at around 9.6V. As the input voltage continues to climb, the output voltage tends to increase as well for a given converter duty cycle, as does the feedback signal, Vo_sns. A higher Vo_sns signal, representing higher output voltage, allows the controller to further reduce the duty cycle to balance the power flow from the primary side to the secondary side so as to regulate the output voltage. As shown in FIG. 14F, the output voltage maintains at Vo_max1 even the input source voltage continues to increase. For a different predefined value, Vz2, the loose regulation characteristics knee point and Vo_max also change. The choice of regulation voltage point Vz, combined with the reflected voltage Vsensed, determines the loose regulation band. In reality, due to the presence of the regulation based on the output voltage feedback, Vo_sns reaches maximum value at a value slightly higher than Vz since the output voltage is no longer varies with the input voltage and/or output load current whenever Vo_sns≥Vz. As shown in this first embodiment, the plotted output values are approximately linear and change in relation to the input voltage until Vo_sns reaches the Vz1, at which the output voltage approaches the predetermined value. If a higher tightly regulated Vo is desired, a higher zener voltage may be selected (Vz2), moving the plot as shown.

Figure 14G:
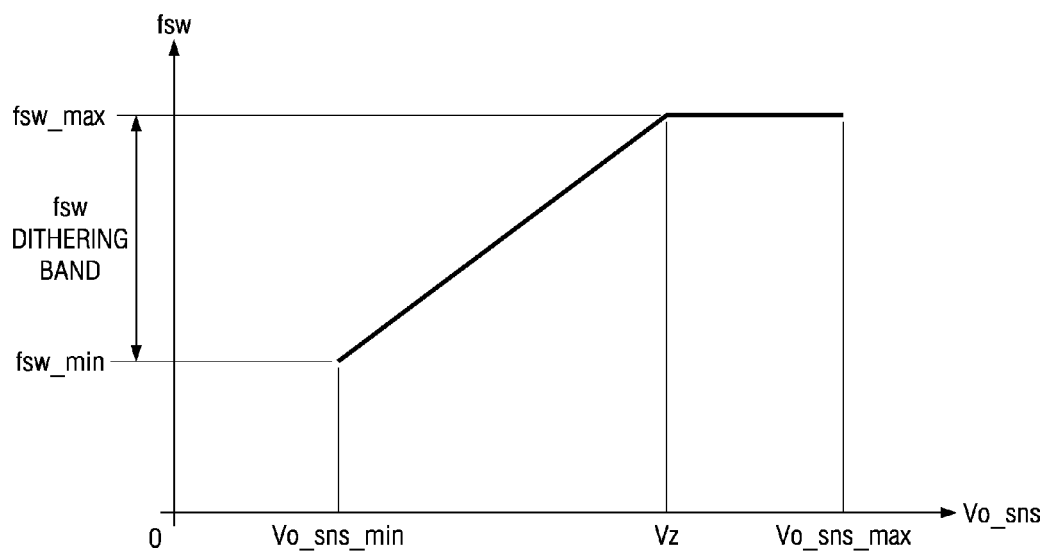
FIG. 14G depicts a graph of the reflected voltage with respect to the primary circuit switching frequency in an embodiment that utilizes frequency dithering.

FIG. 14G depicts a plot of Vo_sns with respect to switching frequency, fsw in this embodiment using a variable switching frequency control methodology along with the loosely regulated continuous feedback control scheme. This improves the conversion efficiency of the converter by maintaining the transformer core flux density nearly constant. This scheme still uses the sensed output voltage to regulate the output continuously. However, the controller varies the switching frequency between the minimum sensed voltage, Vo_sns_min, and the selected regulation voltage, Vz, to maintain the transformer core flux density nearly constant. When the input source voltage is low such that the sensed output voltage, Vo_sns, is below the regulation point, Vz, the operating frequency is reduced to increase the conduction time of the switching devices, which maintains the Volt-Second of the transformer cores (or flux density) nearly constant. This variable switching frequency mechanism based on the sensed output voltage helps to boost the output voltage toward the predefined value at lower source voltage, and hence, the output power and the efficiency for nearly constant power losses. This scheme allows the best use of the transformer cores for a given core cross section area and the minimum number of turns of the transformer.

In another embodiment, shown as a second case in FIG. 14F (1414), the loosely regulated feedback circuit utilizes a resistor sensing circuitry arrangement (as depicted in FIG. 14A, with resistor R11 replacing zener diode CR1). The desired output can vary with the sensed voltage based on a pre-determined math function or the input source voltage, input current, and/or time so as to maximize the efficiency of the downstream POLs. The curve depicts a simple linear function (vs. the sensed output voltage) such that the converter duty cycle is always below the maximum available duty cycle for a given transformer turns ratio and input source voltage. As shown the slope of the plotted curve is somewhat less steep than the first case (1412), and the loose band of output voltage is wider (Vo_min to Vo_max2). In a third case (1416) the zener voltage (Vz) or the desired output voltage is greater than or equal to the maximum sensed voltage (Vo_sns_max), causing the primary side duty cycle to operate at maximum value or 50% in an effort to control the output voltage to a predetermined value. Although the output voltage is unable to reach the predetermined value, the embodiment still attempts to regulate to avoid the output voltage overshoot during a load dump and also provides overvoltage protection during a load dump (as previously discussed). This third case results in an even wider output voltage regulation band (Vo_min to Vo_max3). The slope of these regulation curves can also be adjusted by controlling the gain or set point of the regulation circuit on the primary.

Those skilled in the art will recognize that the controller may also be placed on the secondary side, eliminating the isolation device in the feedback loop. Lower cost components and the loose regulation approach described could still be used in this alternate embodiment, with further simplification. However, additional circuitry would be needed for isolation of primary drive signals and providing secondary bias power.

A described previously, a benefit of the present embodiment over traditional designs is that the present embodiment can utilize a large transformer turns ratio converter to maximize converter efficiency. For example, for a 36V to 75V input and 12V output system a 5:1 transformer turns ratio can be utilized instead of a standard 3:1 transformer turns ratio taking the advantage of POL load. This is beneficial because, in order to tightly regulate the output voltage at 12V, the transformer turns ratio must be chosen based on the minimum input voltage (i.e., 36V as in the present example). A 3:1 turns ratio results in a 12V maximum possible voltage at Vin=36V (without considering the voltage drop due to the internal impedance of the converter with the load current flowing). This relatively low turns ratio results in higher primary side current for a given load current, resulting in higher conduction loss and switching loss associated with the primary side FETs and higher conduction loss associated with the transformer primary winding. A low transformer turns-ratio also creates higher voltage stress on the secondary side synchronous rectifiers for a given maximum source voltage. This higher voltage stress requires switching devices having a higher voltage rating, which, consequently, results in the switching devices having a higher on-state resistance and slower body diode reverse recovery characteristics leading to higher synchronous rectifier conduction and switching losses.

On the other hand, for a loosely regulated dc-dc converter as in the present embodiment, a larger transformer turns ratio such as 5:1 can be utilized for a 36V to 75 Vin, and 10.8V nominal output system since the typical downstream POLs can tolerate a wide input voltage range. A 5:1 transformer turns ratio leads to smaller primary side current so that the primary side switching device and transformer primary winding have lower power losses. The required voltage rating of the synchronous rectifiers is also lower for a given maximum input source voltage. Thus, while it is possible to utilize a turns-ratio of N≥4 for a 36V to 75V input and output>8.3V telecomm bus converter system, it is possible to utilize a turns-ratio of N≥5 for a 51V to 60V input and output>9.6V bus converter system.

The present embodiment provides continuous feedback to allow the primary to control the output voltage toward a predefined value, even when the input voltage is low. For example, if output cannot reach pre-defined set point (due to low input voltage), the control loop commands the maximum possible duty cycle as it seeks to drive the output voltage toward the predefined set point. When input voltage returns to an intermediate value (input line transient or step change), the output voltage increases in turn. The output voltage increase causes the sensing circuit to generate and feed back a voltage signal proportional to the output voltage to cause the primary controller to readjust the duty cycle such that the output voltage is driven to the desired predefined value. The high duty cycle operation during low input source voltage range in the present embodiment also allows efficient use of the transformer, which results in lower input and output ripple and, consequently, reduced downstream filtering device requirements. The operation of this embodiment does not change regulation mode based on the source voltage range like traditional converter designs previously discussed. Since no operation or regulation mode change is required, the possibility of erratic behavior or transients when switching control modes is avoided. The operation mode change can often generate an unwanted audible noise.

The loosely regulated feedback control scheme of the present embodiment also senses the output voltage directly and regulates the output voltage against both the input source and output load variations. As previously stated, the output voltage feedback control loop is present and active at all times, even if the converter output cannot reach the target voltage at some operating conditions. Even if the control loop may command the maximum possible duty cycle at low input source voltage, it can also still automatically regulate the duty cycle downward to improve the load transient performance of the dc-dc converter during a load-dump condition. Otherwise, if such regulating actions were not provided, the output voltage would swing higher during a load-dump, which commonly occurs with non-regulated intermediate bus converter and/or semi-regulated bus converter designs where the switching duty cycle is either fixed or changed slightly solely based on the source voltage and/or the primary winding signal. During the load dump, the input source voltage is fixed, as is the duty cycle of the semi-regulated converter or the quasi-regulated converter. An example is shown in FIGS. 14D and 14E.

FIGS. 14D and 14E depict the positive impact of the loosely regulate feedback control scheme of the present embodiment during a load dump test on a 9.6V and 50 A (450 W) output converter, in which the output of the converter dumps 100% of the load (50 A) to 0% load (0 A). As shown, the loosely regulated converter senses the output voltage swing and regulates the output voltage back to the predefined value (1408) while the unregulated or semi-regulated converter is not able to do so (1406). This is because the duty cycle of the unregulated or semi-regulated converter is fixed or only slightly varied without monitoring the output voltage. The example shown here is from a test with relatively slow load dump slew rate and sufficient output capacitance. The output voltage overshoot can be much worse when a fast slew rate load dump together with small output capacitance used.

Those of ordinary skill in the art will appreciate that the previously described embodiments of the proposed loosely regulated feedback control scheme and the circuitry implementation for isolated intermediate bus converter (IBC) to achieve the best conversion efficiency while maintaining reasonably good output voltage regulation band is for illustrative purposes only and other embodiments thereof are well within the scope and spirit of the present invention. Although the present invention has been described in detail, those skilled in the art should understand that they can make various modifications, changes, substitutions and alterations to the embodiments herein without departing from the spirit and scope of the invention in its broadest form.

The same operation principle can be applied to the other dc-dc converter circuits with very minor design changes. Those of ordinary skill in the art will appreciate that the same control scheme can be extended easily to the half bridge converter, push-pull converter, and other double-ended converter circuits without deviation from the spirit and scope of the inventive concepts proposed herein.

Likewise, the techniques described here can be further extended to single ended circuits, such as forward, flyback and others, with various transformer reset methods including resonant or active clamp. In this case, the maximum duty cycle will be determined by the topology, component selection, and transformer reset scheme, and may exceed 50%. However, the loose regulation techniques described herein may still be applied, with similar benefits.

The scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

We claim:

1. An isolated DC-DC converter system comprising:
   (a) a primary side circuit;
   (b) a secondary side circuit; and
   (c) an output voltage feedback circuit;
   wherein
   said primary side circuit is configured to accept an input voltage;
   said primary side circuit is configured to electrically couple said input voltage to said secondary side circuit;
   said primary side circuit is galvanically isolated from said secondary side circuit;
   said secondary side circuit is configured to generate an output voltage;
   said output voltage is electrically coupled to a main electrical load that is external to said isolated DC-DC converter system;
   said main electrical load comprises a point-of-load (POL) device;
   said output voltage feedback circuit comprises a signal coupling device and controller;
   said signal coupling device is configured to sense the state of said output voltage;
   said signal coupling device is configured to feedback said sensed state to said controller;
   said feedback conforms to a quasi-linear voltage transfer characteristic that is proportional to said output voltage;
   said controller is electrically coupled to and modulates the operation of said primary side circuit;
   said output voltage feedback circuit is configured to provide loose regulation of said output voltage in response to changes in said input voltage; and
   said loose regulation is configured to allow greater than ±4% variation in said output voltage in response to changes in said input voltage.

2. The isolated DC-DC converter system of claim 1 wherein said output voltage feedback circuit is configured to allow ±4% or greater variation in said output voltage in response to changes in said input voltage.

3. The isolated DC-DC converter system of claim 1 wherein said signal coupling device comprises a linear isolator based on magnetic coupling, capacitive coupling, or differential mode amplifier technology.

4. The isolated DC-DC converter system of claim 1 wherein said signal coupling device comprises an optocoupler and said system further comprises:
   (d) resistance device electrically coupled to said optocoupler, said resistance device configured to generate a reflected output voltage.

5. The isolated DC-DC converter system of claim 1 wherein said signal coupling device comprises an optocoupler and said system further comprises:
   (d) resistance device electrically coupled to said optocoupler, said resistance device configured to generate a reflected output voltage; and
   (e) primary side controller configured to control a plurality of switching devices, said switching devices configured to modulate the operation of said primary side circuit, said primary side controller controlling said switching devices based upon said reflected output voltage.

6. The isolated DC-DC converter system of claim 1 wherein said signal coupling device comprises an optocoupler and said system further comprises:
   (d) zener diode electrically coupled to the light emitter of said optocoupler; and
   (e) resistance device electrically coupled to the photosensor of said optocoupler, said resistance device configured to generate a reflected output voltage.

7. The isolated DC-DC converter system of claim 1 wherein said signal coupling device comprises an optocoupler and said system further comprises:
   (d) zener diode electrically coupled to the light emitter of said optocoupler;
   (e) first resistance device in parallel with said zener diode wherein said resistance device is configured to smooth the voltage response of said zener diode; and
   (f) second resistance device electrically coupled to the photosensor of said optocoupler wherein said resistance device is configured to generate a reflected output voltage.

8. The isolated DC-DC converter system of claim 1 wherein said signal coupling device comprises an optocoupler and said system further comprises:
   (d) zener diode electrically coupled to the light emitter of said optocoupler;
   (e) first resistance device in parallel with said zener diode wherein said resistance device is configured to smooth the voltage response of said zener diode;
   (f) second resistance device electrically coupled to the photosensor of said optocoupler wherein said resistance device is configured to generate a reflected output voltage; and
   (g) capacitance device in parallel with said second resistance device wherein said capacitance device is configured to smooth the voltage response of said reflected voltage signal.

9. The isolated DC-DC converter system of claim 1 wherein said signal coupling device comprises an optocoupler and said system further comprises:
   (d) zener diode configured to establish a regulation voltage at the light emitter of said optocoupler;
   (e) resistance device electrically coupled to said optocoupler, said resistance device configured to generate a reflected output voltage; and (f) primary side controller configured to control a plurality of switching devices, said switching devices configured to modulate operation of said primary side circuit, said primary side controller controlling said switching devices using a variable frequency based at least in part upon said reflected output voltage.

10. The isolated DC-DC converter system of claim 1 wherein said signal coupling device comprises an optocoupler and said system further comprises:
(d) resistor voltage divider circuit configured to establish a regulation point at said optocoupler light emitter circuit; and
(e) resistance device electrically coupled to the photosensor of said optocoupler, said resistance device configured to generate a reflected output voltage.

11. The isolated DC-DC converter system of claim 1 wherein said signal coupling device comprises an optocoupler and said system further comprises:
(d) resistor voltage divider circuit electrically coupled to said secondary side circuit, said resistor voltage divider circuit configured to establish a regulation point at the light emitter of said optocoupler;
(e) resistance device electrically coupled to said optocoupler photosensor, said resistance device configured to generate a reflected output voltage; and
(f) primary side controller configured to control a plurality of switching devices, said switching devices configured to modulate operation of said primary side circuit, said primary side controller controlling said switching devices using a variable frequency based at least in part upon said reflected output voltage.

12. An isolated DC-DC converter system comprising:
(a) a primary side circuit; and
(b) a secondary side circuit;
wherein
said primary side circuit is configured to accept an input voltage;
said secondary side circuit is configured to generate a secondary output voltage for use by at least one point-of-load device;
said secondary output voltage is electrically coupled to a main electrical load that is external to said isolated DC-DC converter system;
said main electrical load comprises a point-of-load (POL) device;
said secondary side circuit comprises an optocoupler device;
said secondary side circuit is configured to establish an output voltage loose regulation point based upon a ±4% or greater regulation tolerance in said output voltage;
said optocoupler device is configured to generate a reflected output voltage in said primary side circuit in response to said loose regulation point;
said reflected output voltage conforms to a quasi-linear voltage transfer characteristic that is proportional to said output voltage;
said reflected output voltage is utilized by said primary side circuit to regulate said secondary output voltage toward said loose regulation point.

13. The isolated DC-DC converter system of claim 12 further comprising:
(c) in said primary side circuit:
(1) at least one primary transformer winding;
(2) a plurality of primary switching devices configured to control current flow through said primary transformer winding;
(3) controller configured to provide a variable duty cycle signal for driving said switching devices; and
(4) resistance device electrically coupled to the photosensor of said optocoupler device, said resistance device configured to generate said reflected output voltage signal; and
(d) in said secondary side circuit:
(1) at least one secondary transformer winding inductively coupled to said primary transformer winding; and
(2) voltage divider circuit electrically coupled to the light emitter device of said optocoupler device;
wherein
said secondary side output voltage causes said light emitter device to influence said photosensor device to affect generation of said reflected output voltage signal.

14. The isolated DC-DC converter system of claim 13 wherein said voltage divider circuit comprises a zener diode electrically coupled to said light emitter device.

15. The isolated DC-DC converter system of claim 13 wherein said voltage divider circuit comprises a zener diode in electrically coupled to said light emitter device and a resistance device connected in parallel with said zener diode.

16. The isolated DC-DC converter system of claim 13 wherein said primary side circuit further comprises a capacitance device in parallel with said resistance device wherein said capacitance device is configured to smooth the signal response of said reflected output voltage.

17. The isolated DC-DC converter system of claim 13 wherein the transformer winding turns ratio of said primary circuit to said secondary circuit is such that the transformed voltage is less than said output regulation point for at least a portion of the normal operating range of said isolated DC-DC converter system.

18. The isolated DC-DC converter system of claim 13 wherein said voltage divider circuit is configured to generate an output voltage regulation point for use in generating said reflected output voltage.

19. The isolated DC-DC converter system of claim 13 wherein at low primary input voltages that cause said duty cycle to reach a maximum value, said duty cycle is automatically controlled downward from said maximum value during a load-dump to regulate said output voltage to a loose regulation tolerance greater than ±4% of a predefined value and to limit output voltage transients during said load-dump.

20. The isolated DC-DC converter system of claim 13 wherein said controller is configured to generate a variable switching frequency configured to drive said switching devices, said variable frequency based at least in part upon said reflected output voltage.

21. An isolated DC-DC converter system comprising:
(a) a primary side circuit comprising:
(1) primary transformer winding circuit;
(2) a plurality of primary switching devices for controlling current flow through said primary transformer winding circuit;
(3) a controller configured to provide a variable duty cycle signal for driving said switching devices; and
(4) a photosensor device electrically coupled to a resistance device, said photosensor device configured to generate a reflected output voltage signal for use by said controller; and
(b) a secondary side circuit;
wherein
said secondary side circuit is configured to generate an output voltage;

said output voltage is electrically coupled to a main electrical load that is external to said isolated DC-DC converter system;

said main electrical load comprises a point-of-load (POL) device;

said secondary side circuit comprises a secondary transformer winding inductively coupled to said primary winding;

said secondary side circuit comprises a light emitter device electrically coupled to a voltage divider circuit, said light emitter device in optical view of said photosensor device;

said reflected output voltage conforms to a quasi-linear voltage transfer characteristic that is proportional to said output voltage;

said secondary side output voltage causes said light emitter device to influence said photosensor device to affect generation of said reflected output voltage for use by said controller in adjusting said duty cycle of said primary switching devices; and at low input voltages that cause said duty cycle to reach a maximum value, said duty cycle is automatically controlled downward from said maximum value during a load-dump to regulate said output voltage to a loose regulation tolerance greater than ±4% of a predefined value and to limit output voltage transients during said load-dump.

22. The isolated DC-DC converter system of claim 21 wherein said voltage divider circuit comprises a zener diode in electrically coupled to said light emitter device.

23. The isolated DC-DC converter system of claim 21 wherein said voltage divider circuit comprises a zener diode in electrically coupled to said light emitter device and a resistance device connected in parallel with said zener diode.

24. The isolated DC-DC converter system of claim 21 wherein said primary side circuit comprises a capacitance device in parallel with said resistance device wherein said capacitance device is configured to smooth the signal response of said reflected output voltage.

25. The isolated DC-DC converter system of claim 21 wherein the transformer turns ratio of said primary transformer winding circuit to said secondary transformer winding is such that the transformed voltage is less than said output regulation point for at least a portion of the normal operating range of said isolated DC-DC converter system.

26. The isolated DC-DC converter system of claim 21 wherein said voltage divider circuit is configured to generate an output voltage regulation point for use in generating said reflected output voltage.

27. The isolated DC-DC converter system of claim 21 wherein said maximum value is 50%.

28. The isolated DC-DC converter system of claim 21, said controller further configured to provide a variable switching frequency configured to drive said switching devices, said variable frequency based at least in part upon said reflected output voltage.

29. An isolated DC-DC converter system comprising:
(a) an optocoupler device comprising:
    (1) a light emitter; and
    (2) a photosensor;
(b) a primary side circuit comprising:
    (1) a primary transformer winding circuit;
    (2) a plurality of primary switching devices for controlling current flow through said primary transformer winding circuit;
    (3) a controller configured to provide a variable duty cycle signal for driving said primary switching devices; and
    (4) a resistance device in the emitter circuit of said photosensor configured to generate a reflected output voltage signal for use by said controller; and
(c) a secondary side circuit;

wherein
said secondary side circuit is configured to generate an output voltage;

said output voltage is electrically coupled to a main electrical load that is external to said isolated DC-DC converter system;

said main electrical load comprises a point-of-load (POL) device;

said secondary side circuit comprises:
    (1) secondary transformer winding circuit inductively coupled to said primary transformer winding circuit; and
    (2) voltage divider electrically coupled to said light emitter;

said reflected output voltage conforms to a quasi-linear voltage transfer characteristic that is proportional to said output voltage;

said secondary side output voltage causes said light emitter to influence said photosensor to affect generation of said reflected output voltage for use by said controller in adjusting the duty cycle of said primary switching devices; and at low input voltages that cause said duty cycle to reach a maximum value, said duty cycle is automatically controlled downward from said maximum value during a load-dump to regulate said output voltage to a loose regulation tolerance greater than ±4% of a predefined value and to limit output voltage transients during said load-dump.

30. The isolated DC-DC converter system of claim 29 wherein said voltage divider comprises a zener diode electrically coupled to said light emitter.

31. The isolated DC-DC converter system of claim 29 wherein said voltage divider comprises a zener diode electrically coupled to said light emitter and a resistance device connected in parallel with said zener diode.

32. The isolated DC-DC converter system of claim 29 wherein said primary side circuit comprises a capacitance device in parallel with said resistance device.

33. The isolated DC-DC converter system of claim 29 wherein the turns ratio of said primary transformer winding circuit to said secondary transformer winding circuit is 5:1 or greater.

34. The isolated DC-DC converter system of claim 29 wherein said voltage divider circuit generates an output voltage regulation reference for use by said primary side circuit in generating said reflected output voltage.

35. The isolated DC-DC converter system of claim 29 wherein said maximum value is 50%.

36. The isolated DC-DC converter system of claim 29 wherein said controller is configured to provide a variable switching frequency for driving said switching devices, said variable frequency based at least in part upon said reflected output voltage.

* * * * *